United States Patent
Gago Tripero et al.

(10) Patent No.: US 11,029,191 B2
(45) Date of Patent: Jun. 8, 2021

(54) METHOD AND SYSTEM FOR DETERMINING THE WEIGHT AND CENTRE OF GRAVITY OF A STRUCTURE

(71) Applicant: AIRBUS DEFENCE AND SPACE, S.A.U., Madrid (ES)

(72) Inventors: Ángel Gago Tripero, Madrid (ES); Fernando Ibáñez Gruas, Madrid (ES)

(73) Assignee: Airbus Defence and Space S.A.U., Madrid (ES)

(*) Notice: Subject to any disclaimer, the term of this patent is extended or adjusted under 35 U.S.C. 154(b) by 194 days.

(21) Appl. No.: 16/245,322

(22) Filed: Jan. 11, 2019

(65) Prior Publication Data

US 2019/0219437 A1    Jul. 18, 2019

(30) Foreign Application Priority Data

Jan. 17, 2018 (EP) .................................... 18382018

(51) Int. Cl.
| | |
|---|---|
| *G01G 19/07* | (2006.01) |
| *G01L 1/22* | (2006.01) |
| *G01L 25/00* | (2006.01) |
| *G01M 1/12* | (2006.01) |
| *G01M 5/00* | (2006.01) |
| *G01G 23/01* | (2006.01) |

(52) U.S. Cl.
CPC ............ *G01G 19/07* (2013.01); *G01G 23/01* (2013.01); *G01L 1/225* (2013.01); *G01L 25/00* (2013.01); *G01M 1/12* (2013.01); *G01M 1/125* (2013.01); *G01M 5/0041* (2013.01)

(58) Field of Classification Search
CPC ......... G01G 19/07; G01G 23/01; G01M 1/12; G01M 5/0041; G01M 1/125; G01L 1/225; G01L 25/00
See application file for complete search history.

(56) References Cited

U.S. PATENT DOCUMENTS

| | | | | |
|---|---|---|---|---|
| 3,210,989 | A * | 10/1965 | King ....................... | G01M 1/12 73/65.01 |
| 5,548,517 | A | 8/1996 | Nance | |
| 6,415,242 | B1 * | 7/2002 | Weldon, Jr. ............ | G01G 19/07 702/101 |
| 2012/0215476 | A1* | 8/2012 | Kordt ...................... | G01L 1/225 702/98 |
| 2013/0132025 | A1* | 5/2013 | Watanabe ............... | B60T 8/172 702/150 |
| 2013/0340511 | A1* | 12/2013 | Miller ................... | G01M 1/125 73/65.05 |

FOREIGN PATENT DOCUMENTS

| | | |
|---|---|---|
| CN | 105067097 | 12/2017 |
| EP | 2 490 003 | 8/2012 |
| WO | 01/06827 | 2/2001 |

OTHER PUBLICATIONS

Search Report cited in EP 18382018, dated Jul. 23, 2018, 2 pages.

* cited by examiner

*Primary Examiner* — Marthe Y Marc-Coleman
(74) *Attorney, Agent, or Firm* — Nixon & Vanderhye P.C.

(57) ABSTRACT

A method and system for determining the weight and at least a first coordinate of the center of gravity of a structure such as a vehicle, in particular, an aircraft.

15 Claims, 6 Drawing Sheets

METHOD AND SYSTEM FOR DETERMINING THE WEIGHT AND CENTRE OF GRAVITY OF A STRUCTURE

RELATED APPLICATION

This application claims priority to European Patent Application No. EP18382018.2, filed Jan. 17, 2018, the entire contents of which is incorporated by reference.

TECHNICAL FIELD OF THE INVENTION

The present invention belongs to the field of structures and relates to a method and system for determining the weight and the centre of gravity of a structure such as a vehicle, in particular, an aircraft.

BACKGROUND OF THE INVENTION

Accurate determination of the weight and the centre of gravity of a structure are crucial for ensuring the stability and correct performance of said structure. In the particular case of a vehicle, determining the weight and the centre of gravity of the vehicle is essential to avoid critical movements which could compromise the stability of the vehicle when said vehicle is operated.

According to the current practice, aircrafts and other vehicles are usually weighed on scales or by lifting on jacks with load cells inside hangars. However, when the vehicles are outside hangars, the cargo weight of a vehicle is usually obtained by estimation of each pallet weight when the vehicle is loaded. After loading the weight in the vehicle, a calculus is performed to estimate the centre of gravity (C. G.) based on the estimation of the weight and the estimation of the weight positioning. When the estimations of weight and centre of gravity are not accurate, the safety of the transport performed by said vehicle can be compromised.

In an attempt to provide a solution for the autonomous determination of the weight and centre of gravity of an aircraft in any situation on ground, it has been proposed to obtain the weight and centre of gravity by locating sensors inside the aircraft, especially in the structure where landing gears are attached.

The landing gears are the undercarriage of an aircraft which support the weight of the aircraft and are, in principle, the best place to instrument the sensors. However, landing gear structures have some disadvantages because their geometry changes with weight and is also dependent on the shock absorbers behavior, which is in turn strongly dependent on temperature, internal frictions, etc. Also, during landing operations the sensors installed on the landing gears support very heavy or even shock loads, which can destroy or damage the installed sensors. Therefore, these behaviors, characteristics, and geometry changes have to be taken into account by correcting the measurements obtained by the sensors. This involves complicated and time consuming calculations in order to provide an estimation of the weight and the position of the centre of gravity, the accuracy of which is not fully guaranteed.

The U.S. Pat. No. 5,548,517 A discloses an on-board system for use in measuring, computing and displaying the gross weight and location/relocation of the centre of gravity, for aircrafts. The system also incorporates a software correction program, along with attached hardware, to correct and compensate for physical changes to strut components due to temperature fluctuations, seal drag and hysteresis within modern day "shock absorbing" aircraft landing gear struts. However, the system implies collecting data from several types of sensors in order to deduce the landing gear movements and changes in the geometry of the landing gear, namely pressure sensor data to obtain the telescopic strut movements, rotation sensor data to obtain the hinged movements of struts components, strain gauge data to obtain the axle deflections, etc. From all these data, a complex calculation method has to be carried out to determine the aircraft weight and the center of gravity. Moreover, because there are many factors to be considered, the accuracy of the results could be affected.

There is thus a need for a method for determining the weight and the position of the centre of gravity of a structure which avoids the above problems and provides accurate measurements in a simple and reliable way.

SUMMARY OF THE INVENTION

The present invention provides a solution for the aforementioned problems, by a method for determining the weight and/or at least a first coordinate of the position of the centre of gravity of a structure according to claim 1, a system according to claim 14 and a vehicle according to claim 15. In dependent claims, preferred embodiments of the invention are defined.

In a first inventive aspect, the present invention provides a method for determining the weight and/or at least a first coordinate of the position of the centre of gravity of a structure, the method comprising the following steps:

a) measuring the responses of a first plurality of installed sensors located in sensitive load points of the structure, and b) determining the weight and/or the first coordinate of the position of the centre of gravity of the structure based on the measured responses, as:

$$W = C_w + \sum_{j_w=1}^{k_w} \mu_{j_w} \cdot \beta_{j_w}$$

$$X = C_x + \sum_{j_x=1}^{k_x} \mu_{j_x} \cdot \gamma_{j_x}$$

wherein W is the weight of the structure, X is the first coordinate of the position of the centre of gravity of the structure on a plane of projection, $k_w$ and $k_x$ are natural numbers and $\mu$ are the responses measured by the first plurality of installed sensors, wherein the subscript in the response denotes the sensor which has performed the measurement, wherein for determining the weight a first group of sensors is used which comprises a number of installed sensors $k_w$, for determining the first coordinate of the centre of gravity a second group of sensors is used which comprises a number of installed sensors $k_x$, and wherein coefficients $\beta_{j_w}$, with $j_w=1, \ldots k_w$, and $\gamma_{j_x}$, with $j_x=1, \ldots k_x$, and constants $C_w$ and $C_x$ are previously determined applying the following calibration steps:

i) locating a plurality of calibration sensors in sensitive load points of the structure, wherein the number of calibration sensors is m, m being a natural number, ii) loading the structure with a probe weight, obtaining a loading state, and measuring at least the first coordinate of the position of the centre of gravity and the weight of the structure in said loading state, iii) measuring for each calibration sensor the response associated to the loading state, iv) repeating steps ii) and iii) for a plurality of loading states i, with i=1, . . . s, beings the number of loading states, s being a natural number, v) selecting groups of at least two calibration sensors and solving for each group an equation system with a number of equations P equal to or greater than $N_w+1$, being $N_w$ the number of calibration sensors in the group, wherein the equation system is:

$$W_1 = C_w + \sum_{n=1}^{N_w} \mu_{n,1} \cdot \beta_n$$

$$\vdots$$

$$W_P = C_w + \sum_{n=1}^{N_w} \mu_{n,P} \cdot \beta_n$$

$\mu_{n,q}$, with n=1, . . . , $N_w$ being the measured responses of the calibration sensors and $W_q$ being the weight associated to the respective loading state q, q=1, . . . , P, wherein the equation systems are solved by least squares method, obtaining as a result weight coefficients $\beta_n$ for n=1, . . . , $N_w$, and weight constant $C_w$, vi) determining for each group of calibration sensors an estimated weight for each loading state as $$We_i = C_w + \sum_{n=1}^{N_w} \mu_{n,i} \cdot \beta_n$$

wherein $\mu_{n,i}$ are the responses of the calibration sensors of the group, associated to a loading state i, vii) selecting a first group of calibration sensors which fulfils that a first probable error $PE_w$ is minimum, wherein $PE_w$ is:

$$PE_w = C_E \sqrt{\frac{\sum_{i=1}^{s}(We_i - W_i)^2}{s-(N_w+1)}}$$

s being the total number of loading states, $N_w$ being the number of calibration sensors in said group of calibration sensors, $C_E$ being a real positive number, $We_i$ being the estimated weight and $W_i$ being the measured weight for loading state i, viii) selecting groups of at least two calibration sensors and solving for each group an equation system with a number of equations P equal or greater than $N_x+1$, being $N_x$ the number of calibration sensors in the group, wherein the equation systems is:

$$X_1 = C_x + \sum_{n=1}^{N_x} \mu_{n,1} \cdot \gamma_n$$

$$\vdots$$

$$X_P = C_x + \sum_{n=1}^{N_x} \mu_{n,P} \cdot \gamma_n$$

$\mu_{n,q}$ being the measured responses of the calibration sensors and $X_q$ being the X-coordinate of the centre of gravity associated to the respective loading state q, q=1, . . . , P, wherein the equation systems are solved by least squares method, obtaining as a result X-coefficients for n=1, . . . , $N_x$, and X-constant, ix) determining for each group of calibration sensors an estimated X-coordinate of the centre of gravity for each loading state, as $$Xe_i = C_x + \sum_{n=1}^{N_x} \mu_{n,i} \cdot \gamma_n$$

wherein $\mu_{n,i}$ are the responses of the calibration sensors of the group, associated to a loading state i, x) selecting a second group of calibration sensors which fulfils that a second probable error is minimum, wherein $PE_X$ is:

$$PE_X = C_E \sqrt{\frac{\sum_{i=1}^{s}(Xe_i - X_i)^2}{s-(N_x+1)}}$$

s being the total number of loading states, $N_x$ being the number of calibration sensors in said group of calibration sensors, $C_E$ being a real positive number, $Xe_i$ being the estimated X-coordinate and $X_i$ being the measured X-coordinate for loading state i xi) selecting as the first plurality of installed sensors a plurality of calibration sensors including:
the first group of calibration sensors selected in step vii), and
the second group of calibration sensors selected in step x), wherein $k_w$ is the number of sensors in the first group of calibration sensors and $k_x$ is the number of sensors in the second group of calibration sensors. $k_w$ and $k_x$ are less than or equal to m.

Thus, prior to determining the weight and/or at least a first coordinate of the position of the centre of gravity of the structure based on the measured responses of a first plurality of installed sensors located in such structure, it is determined which sensors are going to be used. The selection of such first plurality of installed sensors is carried out by the calibration steps.

As a result of the calibration steps, the first plurality of installed sensors is selected and coefficients $\beta_{j_w}$, with $j_w=1, \ldots k_w$, and $\gamma_{j_x}$, with $j_x=1, \ldots k_x$, and constants $C_w$ and $C_x$ are computed. In the present invention constant $C_w$ and $C_x$ are real numbers. Based on the computed coefficients and constants, the weight and/or the first coordinate of the centre of gravity of the structure can be determined at any moment as a function of the measured responses of the first plurality of installed sensors using the equations defined on step b) of the method of the present invention.

The present method allows determining at least one of the coordinates of the position of the centre of gravity. In a particular embodiment, the position of the centre of gravity of a structure is defined by two coordinates. These two coordinates indicate the position of the centre of gravity on the plant (floor) of the structure, i.e. the position of the projection of the centre of gravity on the plant of the structure, or on the plant or surface on which the structure is supported. Therefore, through this entire document, the plane of projection will be understood as the plant of the structure or the plant or surface on which the structure is supported. Further, through this entire document, the first coordinate can be any of the two coordinates of the position of the centre of gravity. The position of the centre of gravity is defined in relation to a coordinate system, the origin of which is a predefined point. In an embodiment where the structure is an aircraft the X-axis is preferably selected as the projection on the horizontal plane of the longitudinal direction along the fuselage (roll axis), and the Y-axis is preferably selected as the projection on the horizontal plane of the lateral direction (pitch axis). In a preferred embodiment, the origin of the axes is located at a specified distance in front of the aircraft nose.

In calibration step i) of the present method, a plurality of calibration sensors are installed in sensitive load points of the structure.

In the context of this specification, a sensitive load point of a structure is to be understood as a point of the structure which suffers a substantially linear stress and/or strain in response to the weight of the structure. A substantially linear stress and/or strain in said sensitive load point means that the structural variation in said sensitive load point is only due to a weight loaded in the structure and the weight of the structure itself.

Once a plurality of calibration sensors are installed in the structure, firstly, the structure is loaded with different probe weights, wherein from each probe weight it is obtained a loading state. The first coordinate of the position of the centre of gravity and/or the weight of the structure are measured for each loading state. Measurement of the weight and the first coordinate of the position of the centre of gravity can be performed in a conventional way. In an embodiment a plurality of weighing scales is used for determining the weight and the position of the centre of gravity. In this embodiment the structure is placed on the weighing scales and the weight of the structure is determined as the addition of the weights measured by the weighing scales. The position of the centre of gravity is determined based on the known position of each weighing scale and on the weight measured by each weighing scale. Since a first coordinate of the position of the centre of gravity can be any of the two coordinates of the centre of gravity, any of such coordinates can be determined as described above.

Additionally, the measured response of each calibration sensor is recorded for each loading state. Once the responses of the calibration sensors and the weight and the first coordinate of the position of the centre of gravity are obtained and recorded for each loading state, then the coefficients and constants of the weight and the first coordinate of the position of the centre of gravity of the structure are respectively determined.

The plurality of loading states in the calibration steps can be obtained by modifying the weight and/or the location of the probe weight loaded on the structure.

For determining such coefficients and constants, groups of at least two calibration sensors are selected, and for each group an equation system as defined on steps v) and viii) is solved by the least squares method. In the equation system each equation corresponds to a loading state and the number of equations is equal to or greater than the number of calibration sensors in the group plus one.

To determine which sensors, among the calibration sensors, are going to be the installed sensors used for determining the weight and/or the first coordinate of the position of the centre of gravity of the structure, it is selected:
a first group of calibration sensors which fulfils that a first probable error is minimum; and
a second group of calibration sensors which fulfils that a second probable error is minimum;
wherein such probable errors are defined in step vii) and x) respectively of the method.

The value of constant $C_E$ for calculating the first probable error may be equal to or different from the value of constant $C_E$ used for calculating the second probable error. The constant $C_E$ is a real and positive number. In a preferred embodiment, for calculating the first and second probable errors, the constant $C_E$ is 0.6745.

Thus, for determining the weight it is used a first group of sensors and for determining the first coordinate of the position of the centre of gravity it is used a second group of sensors. Such groups of sensors are previously determined in the calibration steps and define the first plurality of installed sensors which are located in the sensitive load points of the structure and which are used to determine at least one of the weight and the first coordinate of the centre of gravity. One or several of the installed sensors included in one of the groups may be included also in the other group.

Advantageously, since the present invention allows determining at least a first coordinate of the position of the centre of gravity and the weight based on measurements by the sensors located in at least one sensitive load point, the method increases the accuracy and the reliability of the determination of the weight and the centre of gravity.

In a particular embodiment, the method further comprises determining a second coordinate of the position of the centre of gravity of the structure, wherein the second coordinate of the position of the centre of gravity of the structure is determined based on the measured responses of the first plurality of installed sensors, as:

$$Y = C_y + \sum_{j_y=1}^{k_y} \mu_{j_y} \cdot \tau_{j_y}$$

wherein Y is the second coordinate of the position of the centre of gravity of the structure on a plane of projection, $k_y$ is a natural number and $\mu$ are the responses measured by the first plurality of installed sensors, wherein the subscript in the response $\mu$ denotes the sensor which has performed the measurement, wherein for determining the second coordinate of the position of the centre of gravity a third group of sensors is used which comprises a number of installed sensors $k_y$, and wherein Y-coefficients $\tau_{j_y}$, with $j_y=1, \ldots k_y$, and Y-constant $C_y$ are previously determined applying the following calibration steps at least after steps i)-iv), wherein the step ii) further comprises measuring the second coordinate of the position of the centre of gravity of the structure in each loading state:

viii') selecting groups of at least two calibration sensors and solving for each group an equation system with a number of equations equal or greater than $N_y+1$, being $N_y$ the number of calibration sensors in the group, wherein the equation systems is:

$$Y_1 = C_y + \sum_{n=1}^{N_y} \mu_{n,1} \cdot \tau_n$$

$$\vdots$$

$$Y_P = C_y + \sum_{n=1}^{N_y} \mu_{n,P} \cdot \tau_n$$

$\mu_{n,q}$ being the measured responses of the calibration sensors and $Y_q$ being the Y-coordinate of the centre of gravity associated to the respective loading state q, q=1, ..., P, wherein the equation systems are solved by least squares method, obtaining as a result Y-coefficients $\tau_n$ for n=1, ..., $N_y$, and Y-constant $C_y$, ix') determining for each group of calibration sensors an estimated Y-coordinate of the centre of gravity for each loading state as $$Ye_i = C_y + \sum_{n=1}^{N_y} \mu_{n,i} \cdot \tau_n$$

where $\mu_{n,i}$ are the responses of the calibration sensors of the group, associated to a loading state i, and x') selecting a third group of calibration sensors which fulfils that a third probable error $PE_Y$ is minimum, wherein $PE_Y$ is:

$$PE_Y = C_E \sqrt{\frac{\sum_{i=1}^{s}(Ye_i - Y_i)^2}{s - (N_y + 1)}}$$

s being the total number of loading states, $N_y$ being the number of calibration sensors in said group of calibration sensors, $C_E$ being a real positive number, $Ye_i$ being the estimated Y-coordinate and $Y_i$ being the measured Y-coordinate for loading state i, wherein the first plurality of installed sensors further includes the third group of calibration sensors selected in step x') and wherein $k_y$ is the number of sensors in the third group of calibration sensors. $k_y$ is less than or equal to m.

The value of constant $C_E$ for calculating the third probable error may be equal to or different from the values of constant $C_E$ used for calculating the first and/or the second probable error. The constant $C_E$ is a real and positive number. In a preferred embodiment, for calculating the first, second and third probable errors, the constant $C_E$ is 0.6745.

Prior to determining a second coordinate of the position of the centre of gravity of the structure based on the measured responses of the first plurality of installed sensors located in such structure, it is necessary to determine which sensors are going to be used.

Thus, as a result of calibration steps, a third group of installed sensor is further selected and coefficients $\tau_{j_y}$, with $j_y=1, \ldots k_y$, and constant $C_y$ are computed. In the present invention constant $C_y$ is a real number. Based on the computed coefficients and constant, the second coordinate of the centre of gravity of the structure can be also determined at any moment as a function of the measured responses of the first plurality of installed sensors.

According to this embodiment, the calibration further comprises the steps viii')-x'). Once a plurality of calibration sensors are installed in the structure and the structure is loaded with different probe weights to obtain a plurality of loading states, the second coordinate of the position of the centre of gravity is also measured for each loading state. Measurement of the second coordinate of the position of the centre of gravity can be performed in a conventional way, such as using a plurality of weighing scales. The second coordinate of the position of the centre of gravity is determined based on the known position of each weighing scale and on the weight measured by each weighing scale.

Once the responses of the calibration sensors and the second coordinate od the position of the centre of gravity is obtained and recorded for each loading state, then the coefficient $\tau_{j_y}$ and constant $C_y$ of the second coordinate of the position of the centre of gravity of the structure is determined.

For determining such coefficient and constant for the second coordinate of the centre of gravity, groups of at least two calibration sensors are selected, and for each group an equation system as defined on step viii') is solved by the least squares method as for the weight and the first coordinate of the centre of gravity.

To determine which sensors, among the calibration sensors, are going to be installed sensors used for determining the second coordinate of the position of the centre of gravity of the structure, it is selected a third group of calibration sensors which fulfils that a third probable error is minimum, as it is defined in step x'). Thus, in this embodiment the first plurality of installed sensors includes the first group of calibration sensors selected in step vii), the second group of calibration sensors selected in step x) and the third group of calibration sensors selected in step x'). For determining the second coordinate of the position of the centre of gravity the third group of installed sensors is used.

These groups of installed sensors defined the first plurality of installed sensors which are located in the sensitive load points of the structure and which are used to determine the weight and/or the first and second coordinates of the position of the centre of gravity of the structure. One or several of the installed sensors included in one of the groups may be included in one or both of the other groups.

Advantageously, since the present invention allows further determining the second coordinate of the position of the centre of gravity based in measurements by the sensors installed in the at least one sensitive load point, the method increases the accuracy and the reliability of the determination of the position of the centre of gravity.

In a particular embodiment, the method comprises, after steps vii), x) and/or x'), verifying for at least one loading state i that the first group of calibration sensors fulfills that a weight residual value ($\varepsilon w_i$) is lower than a first predefined threshold, wherein $$\varepsilon w_i = 100 \cdot \frac{(We_i - W_i)}{W_i},$$

and/or the second group of calibration sensors fulfills that a X-coordinate residual value ($\varepsilon x_i$) is lower than a second predefined threshold, wherein $$\varepsilon x_i = 100 \cdot \frac{(Xe_i - X_i)}{X_i},$$

and/or the third group of calibration sensors fulfills that a Y-coordinate residual value ($\varepsilon y_i$) is lower than a third predefined threshold, wherein $$\varepsilon y_i = 100 \cdot \frac{(Ye_i - Y_i)}{Y_i},$$

In an embodiment the first predefined threshold, the second predefined threshold and/or the third predefined threshold is 3%, preferably 2%.

Advantageously, this additional step of verifying if the groups of calibration sensors selected fulfill such requirement allows checking the accuracy of the equations.

In a particular embodiment, the present method comprises performing the following steps prior to step a):

selecting at least one sensitive load point in the structure, and installing at least one sensor on the at least one sensitive load point.

In a particular embodiment, at each iteration of step ii) of the present method, the structure is loaded with the probe weights $Wp_i$ in steps of a percentage of a maximum admissible weight of the structure. For example the structure can be loaded with the 0%, 20%, 40%, 60%, 80% and 100% of the probe weights $Wp_i$. Advantageously, loading the structure in steps allows checking the linearity of the sensors.

In a particular embodiment of the method:

a plurality of first groups of calibration sensors are selected at step vii), wherein the first groups of calibration sensors fulfil that the first probable error is minimum, and/or a plurality of second groups of calibration sensors are selected at step x), wherein the second groups of calibration sensors fulfil that the second probable error is minimum, and/or a plurality of third groups of calibration sensors are selected at step x'), wherein the third groups of calibration sensors fulfil that the third probable error is minimum.

In this embodiment more than one group of calibration sensors are selected for determining the weight and/or at least one of the coordinates of the position of the centre of gravity, wherein each group of calibration sensors has an associated equation for determining the weight and/or at least one of the coordinates of the position of the centre of gravity. Thus, once the calibration has been performed for a structure, the weight and/or the position of the centre of gravity of the structure loaded with an unknown weight can be determined using several equations. The redundancy in the determination of the weight and/or the position of the centre of gravity of the structure allows verifying if the method and/or the sensors are working properly. In a preferred embodiment at least two groups of sensors having different number of sensors are selected.

In a particular embodiment, the structure is an on ground vehicle.

In a particular embodiment, the at least one sensitive load point of the structure is located in at least one bulkhead of the vehicle.

In the context of this specification, the bulkhead of an on ground vehicle is to be understood as the area of the vehicle where the support elements are fixed. The support elements of the on ground vehicle are the elements on which the vehicle is seated on the ground. For example, a bulkhead may be the area where such support elements are housed. In a particular embodiment wherein the vehicle is an aircraft, the support elements are understood as landing gears.

In a particular embodiment, the on ground vehicle is an aircraft.

In a particular embodiment, the at least one sensitive load point is located in at least one landing gear bulkhead.

In a particular embodiment, the at least one sensitive load point is located in the nose landing gear pin.

In a particular embodiment, the at least one sensitive load point is located in the main landing gear pin.

As a difference with the state of the art, in the method of the invention the landing gears are not instrumented with sensors. In this way, the measurements taken by the sensors are not dependent on changes in geometry nor on the shock absorbers behavior. In this embodiment, the instrumentation is located in an area surrounding the landing gears or in instrumented pins receiving loads without direction changes or with very small direction changes. Instrumenting in such way there is not dependency on geometry changes neither on temperatures nor sticking influences neither other extraneous influences.

In a particular embodiment, the position of the centre of gravity and/or the weight are measured in calibration step ii) using scales and/or jacks with load cells, preferably, using three hydraulic jacks.

In a particular embodiment, the method further comprises the following steps:

c) measuring the responses of a second plurality of installed sensors located in at least one lifting surface of the structure, and d) determining a corrected weight of the structure and/or a corrected position of the centre of gravity of the structure as:

$$W_{corrected} = W - \sum_{h=1}^{M} V'_h$$

$$X_{corrected} = \frac{X \cdot W - \sum_{h=1}^{M} (X'_h \cdot V'_h)}{W - \sum_{h=1}^{M} V'_h}$$

$$Y_{corrected} = \frac{Y \cdot W - \sum_{h=1}^{M} (Y'_h \cdot V'_h)}{W - \sum_{h=1}^{M} V'_h}$$

wherein W is the calculated weight of the structure, (X, Y) is the calculated position of the centre of gravity of the structure, wherein M is the number of lifting surfaces considered at step c), wherein $V'_h$ is the vertical component of a resultant force applied on a lifting surface h of the structure, wherein $X'_h$ and $Y'_h$ are the X-coordinate and Y-coordinate, respectively, through which the vertical component of the resultant force passes, wherein $V'_h$, $X'_h$ and $Y'_h$ are determined based on the measured responses, for each lifting surface as:

$$V' = C'_v + \sum_{j_v=1}^{L_v} \mu'_{j_v} \cdot \beta'_{j_v}$$

$$X' = C'_x + \sum_{j_x=1}^{L_x} \mu'_{j_x} \cdot \gamma'_{j_x}$$

$$Y' = C'_y + \sum_{j_y=1}^{L_y} \mu'_{j_y} \cdot \tau'_{j_y}$$

wherein $\mu'$ are the responses measured by the second plurality of installed sensors, the subscript in the response denoting the sensor which has performed the measurement, being $L_v$, $L_x$ and $L_y$ natural numbers, wherein W, V' and $W_{corrected}$ are expressed in the same axes system; X, X' and $X_{corrected}$ are expressed according to the same coordinate system, and Y, Y' and $Y_{corrected}$ are expressed according to the same coordinate system, and wherein:

for determining V' a fourth group of sensors is used which comprises a number of installed sensors $L_v$, for determining X' a fifth group of sensors is used which comprises a number of installed sensors $L_x$, for determining Y' a sixth group of sensors is used which comprises a number of installed sensors $L_y$, and wherein coefficients $\beta'_{j_v}$, with $j_v=1, \ldots L_v$, $\gamma'_{j_x}$, with $j_x=1, \ldots L_x$, and $\tau'_{j_y}$, with $j_y=1, \ldots L_y$, and constants $C'_v$, $C'_x$, $C'_y$ are previously determined applying the following calibration steps:

s-i) locating a plurality of calibration sensors in at least one lifting surface of the structure, wherein the number of calibration sensors is m', m' being a natural number, s-ii) applying a probe force to the at least one lifting surface of the structure, obtaining a force state, and measuring the vertical component of the resultant force, the X-coordinate and the Y-coordinate respectively through which the vertical component of the resultant force passes in said force state, s-iii) measuring for each calibration sensor the response associated to the force state, s-iv) repeating steps s-ii) and s-iii) for a plurality of force states ƒ, with ƒ=1, . . . s', being s' the number of force states, wherein for each force state a different probe force is applied to the at least one lifting surface, s' being a natural number, s-v) selecting groups of at least two calibration sensors and solving for each group an equation system with a number of equations greater than $N_v+1$, being $N_v$ the number of calibration sensors in the group, wherein the equation system is:

$$V'_1 = C'_v + \sum_{n=1}^{N_v} \mu'_{n,1} \cdot \beta'_n$$

$$\vdots$$

$$V'_P = C'_v + \sum_{n=1}^{N_v} \mu'_{n,P} \cdot \beta'_n$$

with $\mu'_{n,q}$, with $n=1, \ldots, N_v$ being the measured responses of the calibration sensors and $V'_q$ being the vertical component of the resultant force measured for the respective force state q, with $q=1, \ldots, P$, wherein the equation systems are solved by least squares method, obtaining as a result vertical force coefficients $\beta'_n$ for $n=1, \ldots, N_v$ and constant $C'_v$, s-vi) determining, for each group of calibration sensors an estimated vertical force $Ve'_f$ for each force state ƒ as $$Ve'_f = C'_v + \sum_{n=1}^{N_v} \mu'_{n,f} \cdot \beta'_n$$

where $\mu'_{n,f}$ are the responses of the calibration sensors of the group, associated to a force state ƒ, s-vii) selecting a fourth group of calibration sensors which fulfils that a fourth probable error $PE'_v$ is minimum, wherein $PE'_v$ is:

$$PE'_v = C_E \sqrt{\frac{\sum_{f=1}^{s'} (Ve'_f - V'_f)^2}{s' - (N_v + 1)}}$$

s' being the total number of force states, $N_v$ being the number of calibration sensors in said group of calibration sensors, $C_E$ being a real positive number, $Ve'_f$ being the estimated vertical force and $V'_f$ being the vertical component of the resultant force measured for force state ƒ, s-viii) selecting groups of at least two calibration sensors and solving for each group an equation system with a number of equations equal to or greater than $N_x+1$, being $N_x$ the number of calibration sensors in the group, wherein the equation systems is:

$$X'_1 = C'_x + \sum_{n=1}^{N_x} \mu'_{n,1} \cdot \gamma'_n$$

$$\vdots$$

$$X'_P = C'_x + \sum_{n=1}^{N_x} \mu'_{n,P} \cdot \gamma'_n$$

$\mu'_{n,q}$ being the measured responses of the calibration sensors and $X'_q$ being the X-coordinate through which the measured vertical component of the resultant force passes, associated to the respective force state q, $q=1, \ldots, P$ wherein the equation systems are solved by least squares method, obtaining as a result X-coefficients $\gamma'_n$ for $n=1, \ldots, N_x$ and X-constant $C'_x$, s-ix) determining for each group of calibration sensors an estimated X-coordinate $Xe'_f$ through which the vertical component of the resultant force passes for each force state ƒ, as $$Xe'_f = C'_x + \sum_{n=1}^{N_x} \mu'_{n,f} \cdot \gamma'_n$$

where $\mu'_{n,f}$ are the responses of the calibration sensors of the group, associated to a force state $f$, s-x) selecting a fifth group of calibration sensors which fulfils that a fifth probable error $PE'_X$ is minimum, wherein $PE'_X$ is:

$$PE'_X = C_E \sqrt{\frac{\sum_{f=1}^{s'} (Xe'_f - X'_f)^2}{s' - (N_x + 1)}}$$

s' being the total number of force states, $N_x$ being the number of calibration sensors in the group of calibration sensors, $C_E$ being a real positive number, $Xe'_f$ being the estimated X-coordinate through which the vertical component of the resultant force passes and $X'_f$ being the X-coordinate through which the measured vertical component of the resultant force passes for force state $f$, s-xi) selecting groups of at least two calibration sensors and solving for each group an equation system with a number of equations P equal or greater than $N_y+1$, being $N_y$ the number of calibration sensors in the group, wherein the equation system is:

$$Y'_1 = C'_y + \sum_{n=1}^{N_y} \mu'_{n,1} \cdot \tau'_n$$

$$\vdots$$

$$Y'_P = C'_y + \sum_{n=1}^{N_y} \mu'_{n,P} \cdot \tau'_n$$

$\mu'_{n,q}$ being the measured responses of the calibration sensors and $Y'_q$ being the Y-coordinate through which the measured vertical component of the resultant force passes, associated to the respective force state, q=1, . . . , P wherein the equation systems are solved by least squares method, obtaining as a result Y-coefficients $\tau'_n$ for n=1, . . . , $N_y$, and Y-constant $C'_y$, s-xii) determining for each group of calibration sensors an estimated Y-coordinate through which the vertical component of the resultant force passes for each force state, as $$Ye'_f = C'_y + \sum_{n=1}^{N_y} \mu'_{n,f} \cdot \tau'_n$$

where $\mu'_{n,f}$ are the responses of the calibration sensors of the group, associated to a force state $f$, s-xiii) selecting a sixth group of calibration sensors which fulfils that a sixth probable error $PE'_Y$ is minimum, wherein $PE'_Y$ is:

$$PE'_Y = C_E \sqrt{\frac{\sum_{f=1}^{s'} (Y'e_f - Y'_f)^2}{s' - (N_y + 1)}}$$

s' being the total number of force states, $N_y$ being the number of calibration sensors in the selected group of calibration sensors, and $C_E$ being a real positive number, s-xiv) selecting as the second plurality of installed sensors a plurality of calibration sensors including:
the fourth group of calibration sensors selected in step s-vii),
the fifth group of calibration sensors selected in step s-x), and
the sixth group of calibration sensors selected in step s-xiii), wherein $L_v$ is the number of sensors in the fourth group of calibration sensors, $L_x$ is the number of sensors in the fifth group of calibration sensors and $L_y$ is the number of sensors in the sixth group of calibration sensors. $L_v$, $L_x$ and $L_y$ are less than or equal to m'.

In addition to determining the total weight and the position of the centre of gravity of a structure, the present method also allows determining the external forces acting on lifting surfaces of the structure. Therefore, the results of the weight and the position of the centre of gravity obtained in step b) can advantageously be corrected on the basis of said external forces acting on the lifting surfaces of the structure.

Through this entire document, the coordinates through which the vertical force or the vertical resultant force passes are defined in relation to the same coordinate system of the centre of gravity. The external forces which act on lifting surfaces are defined in relation to an axes system which will be understood as the previous coordinate system.

Prior to determining the corrected weight and the corrected centre of gravity of the structure based on the vertical component of a resultant force applied on a lifting surface of the structure and the X-coordinate and the Y-coordinate through which such vertical component of the resultant force passes, it is necessary to determine such component and coordinates based on the measured responses of a second plurality of installed sensors located in the lifting surface of a structure, and also to determine which sensors are going to be used. The determination of such second plurality of installed sensors is carried out by calibration steps.

The calibration steps defined for determining the weight and the position of the centre of gravity are similar to the calibration steps for determining the resultant force and the X-coordinate and the Y-coordinate through which the vertical component of the resultant force passes according to each lifting surface of the structure.

In the calibration steps s-i) to s-xi) of the present method, a plurality of calibration sensors are installed in at least one lifting surface h of the structure. In the context of the specification, a lifting surface of a structure is to be understood as a structure body shaped to produce a normal reaction to its movement through the air.

Once a plurality of calibration sensors are installed in at least one lifting surface, different probe forces are applied on the lifting surface, obtaining different force states. The vertical component, and the X-coordinate and the Y-coordinate respectively through which such vertical component of the resultant force passes in each force state can be measured in a conventional way. Furthermore, the measured response of each calibration sensor is recorded for each force state. Once the responses of the calibration sensors and the vertical component, and the X-coordinate and the Y-coordinate of the resultant force are obtained and recorded for each force state, then the coefficients $\beta'_{j_z}$, $\gamma'_{j_x}$ and $\tau'_{j_y}$ and constants $C'_v$, $C'_x$, $C'_y$ are respectively determined.

For determining such coefficients and constants, groups of at least two calibration sensors are selected, and for each group an equation system as defined on steps s-v), s-viii) and s-xi) is solved by the least squares method. In the equation system each equation corresponds to a loading state and the number of equations is equal to or greater than the number of calibration sensors in the group plus one.

To determine which sensors, among the calibration sensors, are going to be the installed sensors used for determining the vertical component of a resultant force, the X-coordinate and the Y-coordinate respectively through which the vertical component of the resultant force passes on lifting surfaces, it is selected:
  a fourth group of calibration sensors which fulfils that a fourth probable error is minimum;
  a fifth group of calibration sensors which fulfils that a fifth probable error is minimum; and
  a sixth group of calibration sensors which fulfils that a sixth probable error is minimum;
wherein such probable errors are defined in step s-vii), s-x) and s-xiii) respectively of the present method.

For determining the vertical component of a resultant force applied on the lifting surfaces it is used a fourth group of sensors; for determining the X-coordinate through which the vertical component of the resultant force passes on the lifting surface it is used a fifth group of sensors; and for determining the Y-coordinate through which the vertical component of the resultant force passes it is used a sixth group of sensors. Such three groups of sensors are previously determined in the calibration steps and define the second plurality of installed sensors which are located in lifting surfaces of the structure and are used to determine a corrected weight and/or a corrected centre of gravity of the structure. One or several of the installed sensors included in one of the groups may be included in one or both of the other groups. In a particular embodiment wherein it is determined only one of the coordinates of the position of the centre of gravity, it is understood that the present method can correct such coordinate of the centre of gravity independently.

Advantageously, since the present embodiment allows determining the position of the centre of gravity and the weight considering the external forces applied on lifting surfaces based on measurements by the sensors located in at least one lifting surface, the method increases the accuracy and the reliability of the determination of the weight and the centre of gravity.

In a more particular embodiment, the structure is an aircraft comprising lifting surfaces, and in step s-ii) and s-iv) of calibration steps, a plurality of probe forces are applied on the at least one lifting surface of the aircraft.

In a second inventive aspect, the present invention provides a system configured for determining the weight and/or at least a first coordinate of the position of the centre of gravity of a structure, comprising:
  a plurality of installed sensors located on the structure,
  a data acquisition module configured to register data from the plurality of installed sensors on the structure, and
  data processing means configured to perform at least step b) of the method according to the first inventive aspect.

The data acquisition module and the data processing means may be implemented as two different elements in data communication or as a single processor.

In a third inventive aspect, the present invention provides a vehicle comprising the system according to the second inventive aspect. Preferably the vehicle is an aircraft.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Once the object of the invention has been outlined, specific non-limitative embodiments are described hereinafter. In particular, it is described an embodiment of the method for determining the weight (W) and a first coordinate, which is the X-coordinate, of the position of the centre of gravity (X, Y) of an aircraft (6). In this particular embodiment, the position of the centre of gravity is defined in relation to a coordinate system, the origin of which is a predefined point. In this particular example, the origin is located in the X-axis in front of the nose of the aircraft (6) if seen from the side, in particular at a distance of 1587 mm from the nose. In this aircraft (6) the X-axis is selected as the projection on the horizontal plane of the longitudinal direction along the fuselage (roll axis).

Figure 1:
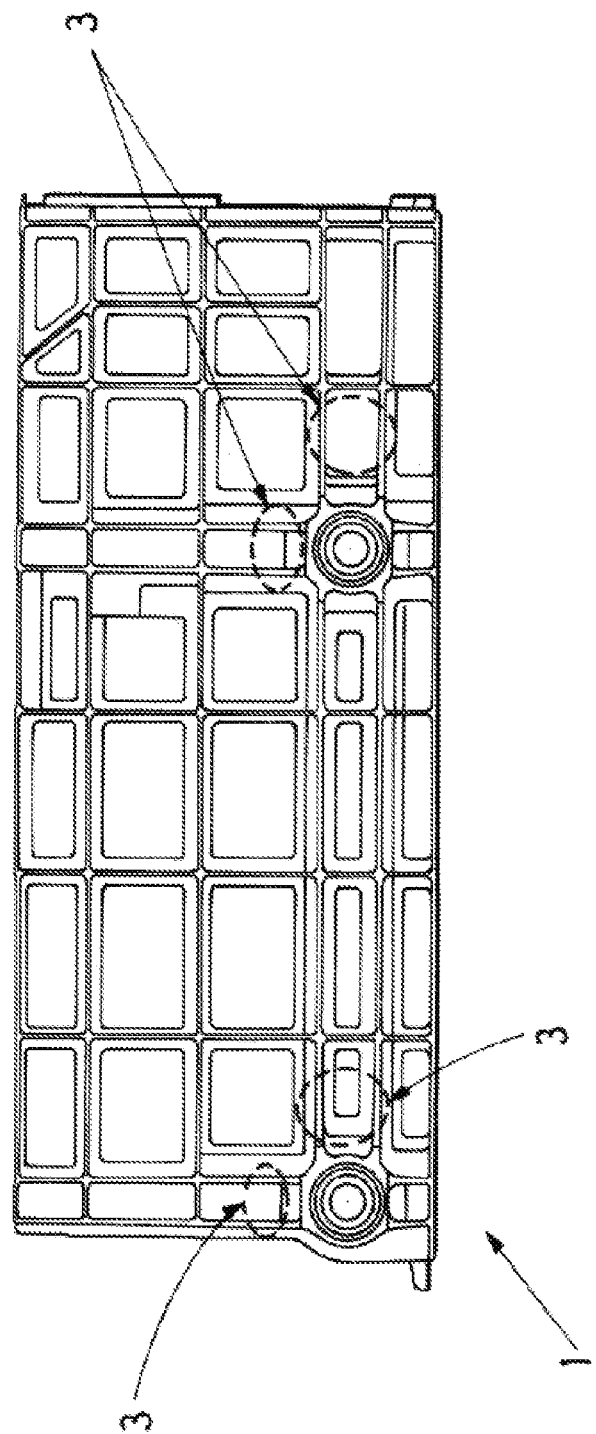
FIG. 1 shows sensitive load points used in an embodiment of the present invention.
Figure 2:
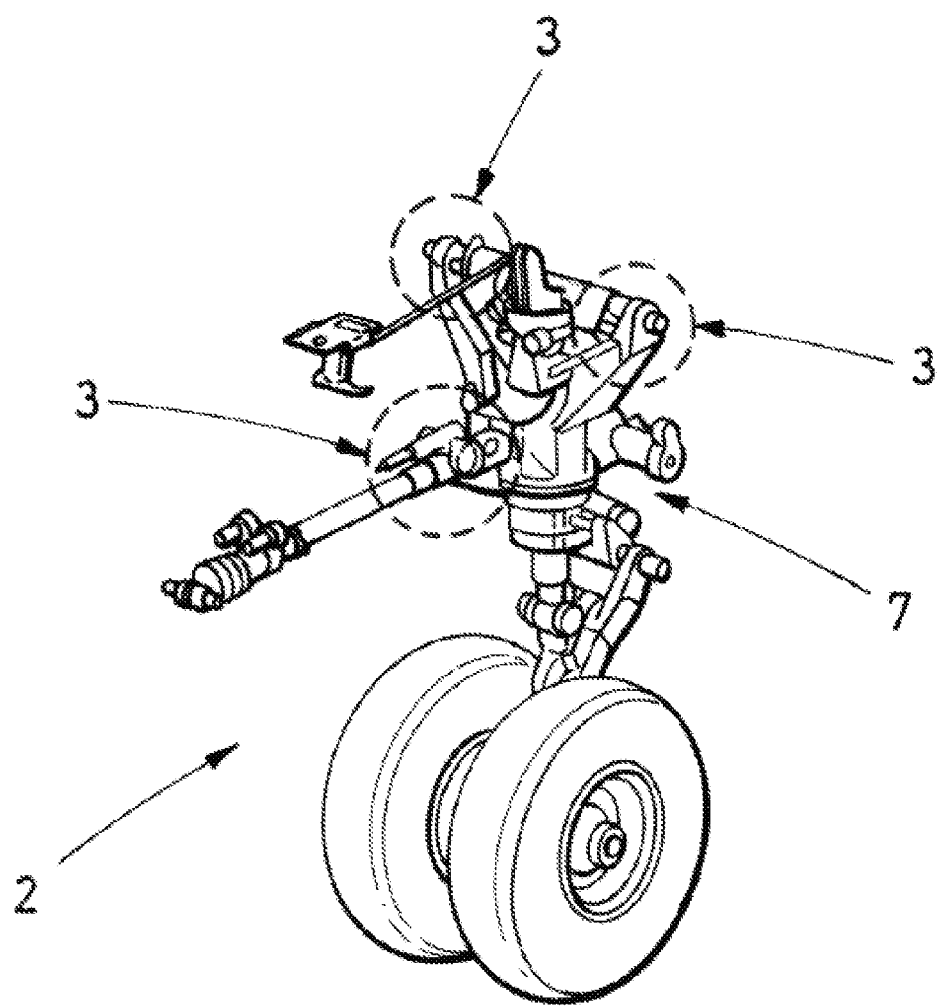
FIG. 2 shows sensitive load points used in an embodiment of the present invention.

FIGS. 1 and 2 respectively show a main landing gear bulkhead (1) and a nose landing gear (2) of an aircraft (6). Selected sensitive load points (3) in the main landing gear bulkhead (1) and in pins (7) of the nose landing gear (2) are indicated in these figures. In the context of the invention the sensitive load points (3) of the structure which weight and/or centre of gravity are to be determined are the points where the structure is seated on the ground. In this particular example four of the sensitive load points (3) are located in the main landing gear bulkhead (1) and three of the sensitive load points (3) are located in the pins (7) of the nose landing gear (2), as shown in FIGS. 1 and 2 respectively.

Figure 3A:
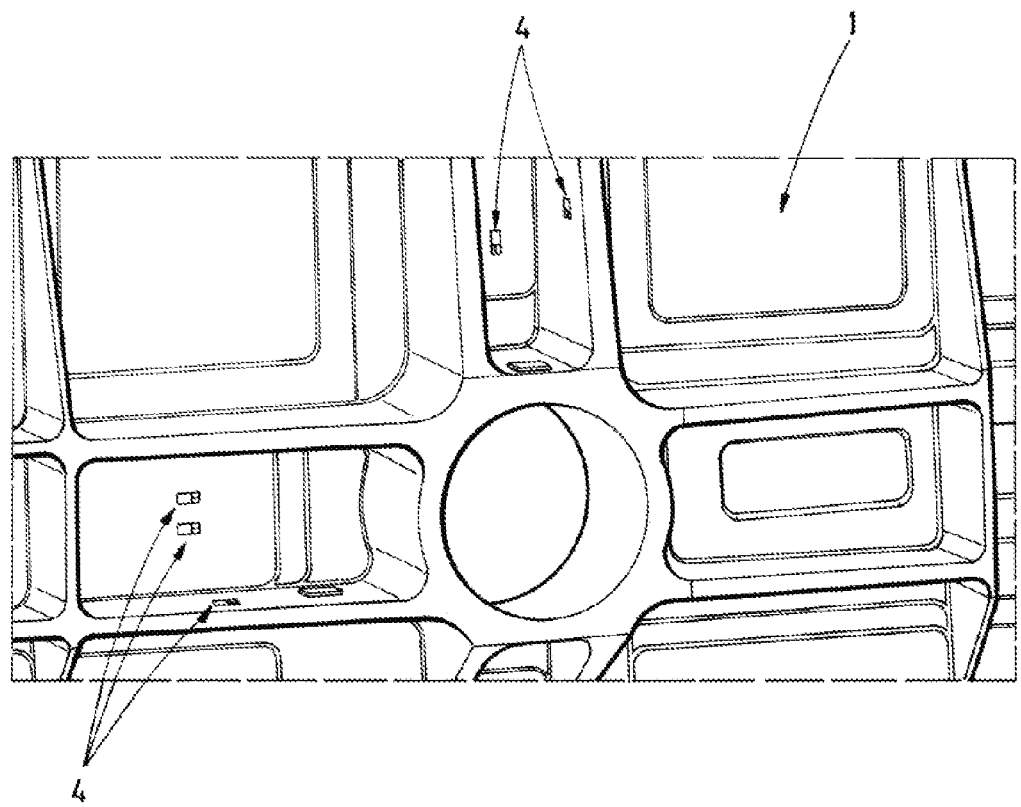
FIGS. 3a-3b show the installation of a sensor in at least one sensitive load point according to an embodiment of the present invention.
Figure 3B:
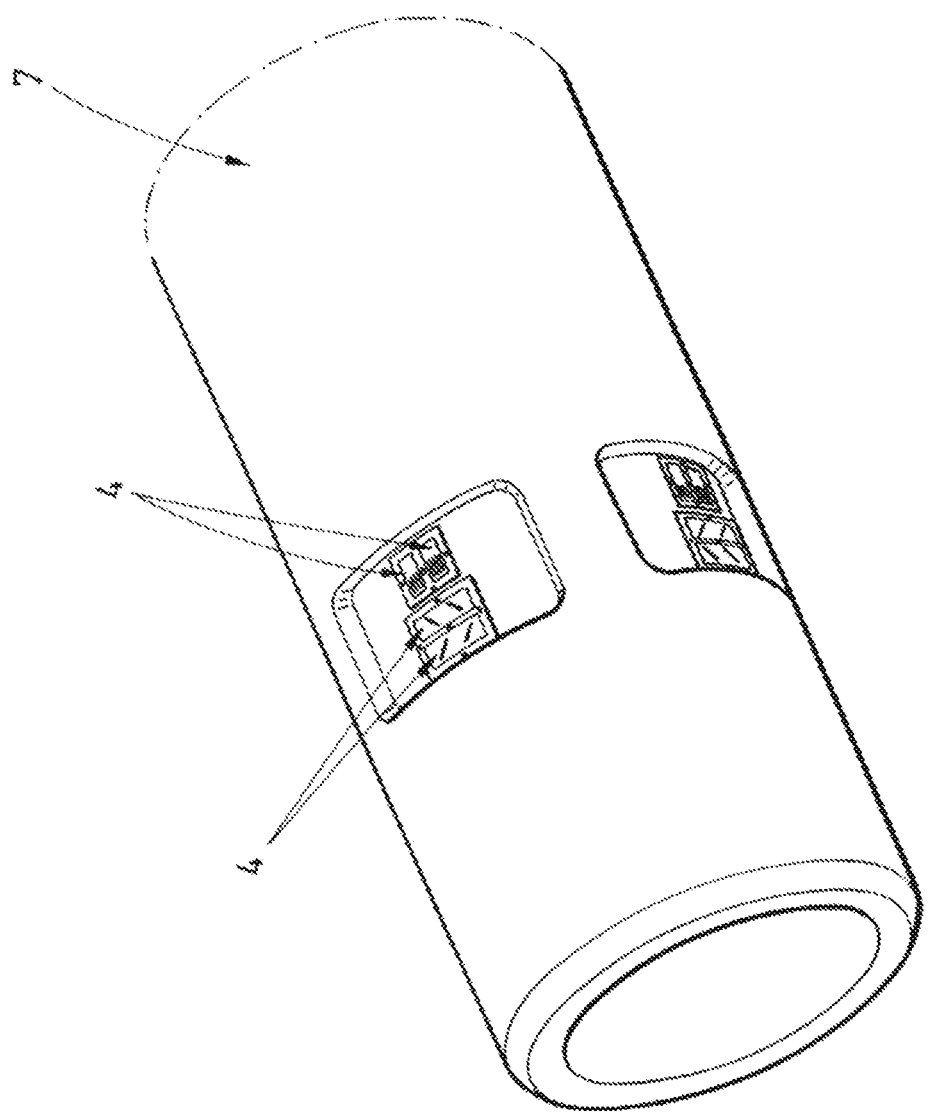

After selecting the sensitive load points (3), at least one sensor (4) is located in each sensitive load point (3). In this particular example, the sensors (4) are strain gauge bridges. In FIGS. 3a and 3b, some of the strain gauge bridges (4) installed on the structure are schematically shown.

The strain gauge bridges (4) are attached to the structure by abrasion, adhesive application, application of pressure, and thermal curing. In the example shown in FIG. 3a, the strain gauge bridges (4) are attached to the main landing gear bulkhead (1). In FIG. 3b, the strain gauge bridges (4) are attached to the nose landing gear pin (7). In this particular example of FIG. 3b, the sensor (4) is embedded in one of the pins (7) of the nose landing gear pins.

Example

Figure 4:
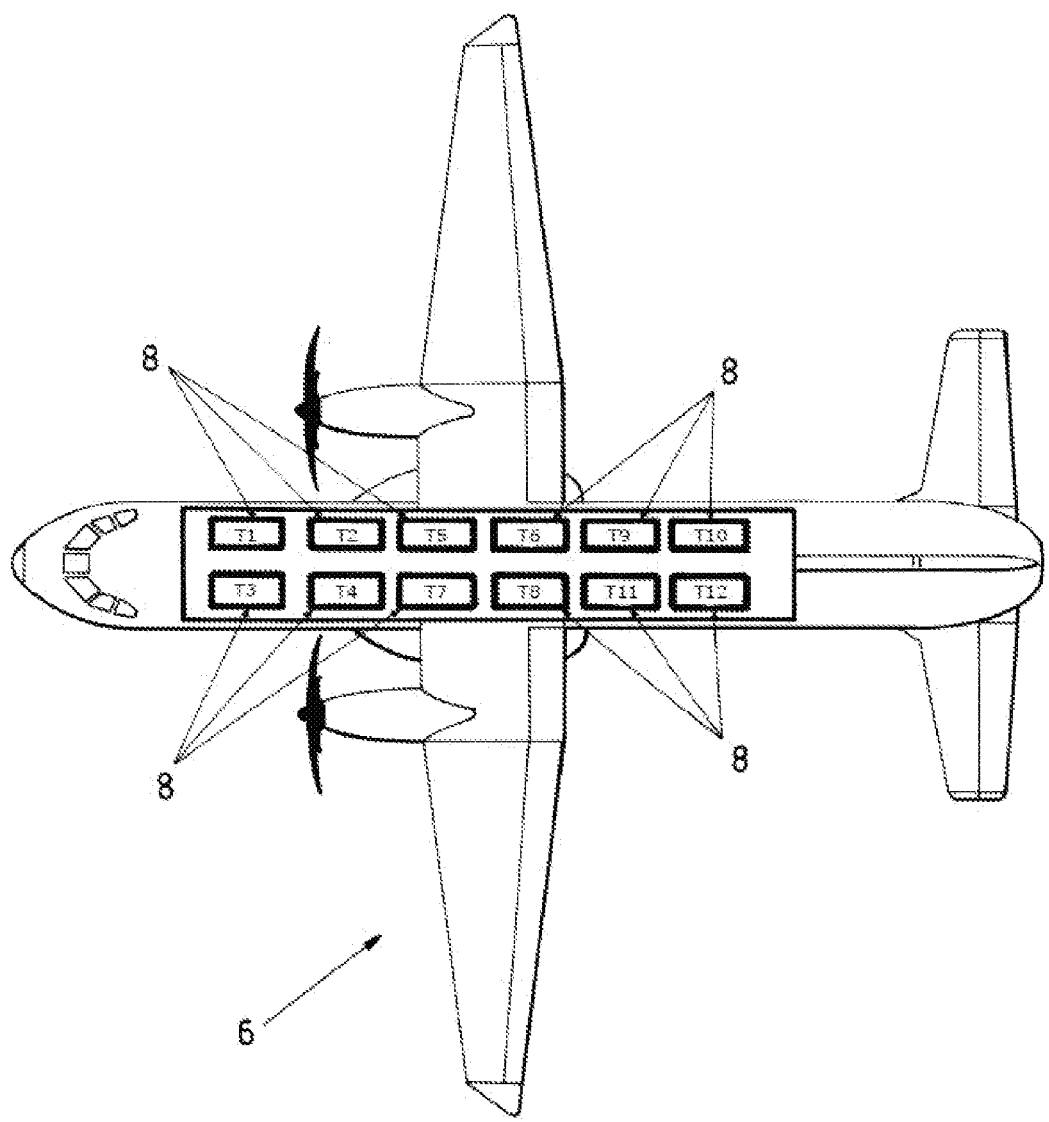
FIG. 4 shows an aircraft loaded with weight probes according to an embodiment of the present invention.

For a particular example, prior to determining the weight (W) and the X-coordinate (X) of the position of the centre of gravity (X, Y) of an aircraft (6), the following calibration steps were performed:

i) 19 calibration sensors were located in sensitive load points (3) of the aircraft (6). Thus, in this particular example m=19. In this particular example, all the calibration sensors located are strain gauges bridges. Further, the calibration sensors 1 to 16 are located in the main landing gear bulkhead, and the calibration sensors 17 to 19 are located in the nose landing gear pin (7).

ii) The structure was loaded with a probe weight $Wp_1$, obtaining a first loading state (i=1), and the X-coordinate of the centre of gravity ($X_1$) and the weight ($W_1$) of the aircraft were measured for the loading state i=1. In this particular example, the Y-coordinate of the centre of gravity is not exemplified below, since it is obtained as for the X-coordinate.

iii) For each calibration sensor r the response $\mu_{r,1}$ associated to the loading state i=1 was measured, with r=1, ... 19.

iv) Steps ii) and iii) were repeated for a plurality of loading states i. In this example, nine different configurations of loaded probe weights were used, different loading states being obtained by modifying the weight and/or the location of the probe weight loaded on the aircraft (6). As schematically shown in FIG. 4, twelve water tanks (8) were arranged at specific positions in the aircraft (6). In this example the loading states were obtained by filling up different combinations of tanks at different water levels. Tables 1A-1B show the filled water tanks and the maximum probe weight in each configuration. In Tables 1A-1B and in FIG. 4 the twelve tanks (8) are identified as T1, T2, . . . T12.

TABLE 1A

| | Probe weight (kg) | | | | | | |
|---|---|---|---|---|---|---|---|
| | T1 | T2 | T3 | T4 | T5 | T6 | T7 |
| configuration 1 | 1000 | | 1000 | | | | |
| configuration 2 | | | | | | | |
| configuration 3 | 1000 | 1000 | | | | | |
| configuration 4 | | 1000 | | 1000 | | | |
| configuration 5 | | | | | 1000 | 1000 | 1000 |
| configuration 6 | | | | | | | 1000 |
| configuration 7 | | | | | | | 1000 |
| configuration 8 | | 1000 | | | | | |
| configuration 9 | | 1000 | | 1000 | 1000 | 1000 | 1000 |

TABLE 1B

| | Probe weight (kg) | | | | | |
|---|---|---|---|---|---|---|
| | T8 | T9 | T10 | T11 | T12 | Total Kg |
| configuration 1 | | | | | | 2000 |
| configuration 2 | | 1000 | | 1000 | | 2000 |
| configuration 3 | | | | | | 2000 |
| configuration 4 | | | | 1000 | 1000 | 4000 |
| configuration 5 | 1000 | | | | | 4000 |
| configuration 6 | 1000 | | | 1000 | 1000 | 4000 |
| configuration 7 | 1000 | 1000 | | 1000 | | 4000 |
| configuration 8 | | 1000 | | | | 2000 |
| configuration 9 | 1000 | 1000 | 1000 | 1000 | 1000 | 10000 |

Additionally, for each of the configurations of filled water tanks (8) of Tables 1A-1B, several percentages of filling were considered. For example, for configuration 1 as indicated in Tables 1A-1B increasing percentages of tanks filling of 33%, 66%, 100% and decreasing percentages of tanks filling of 66%, 33% and 0% where considered. As a result, six loading states were obtained for configuration 1 of tanks (8) indicated in Table 1.

Figure 5B:
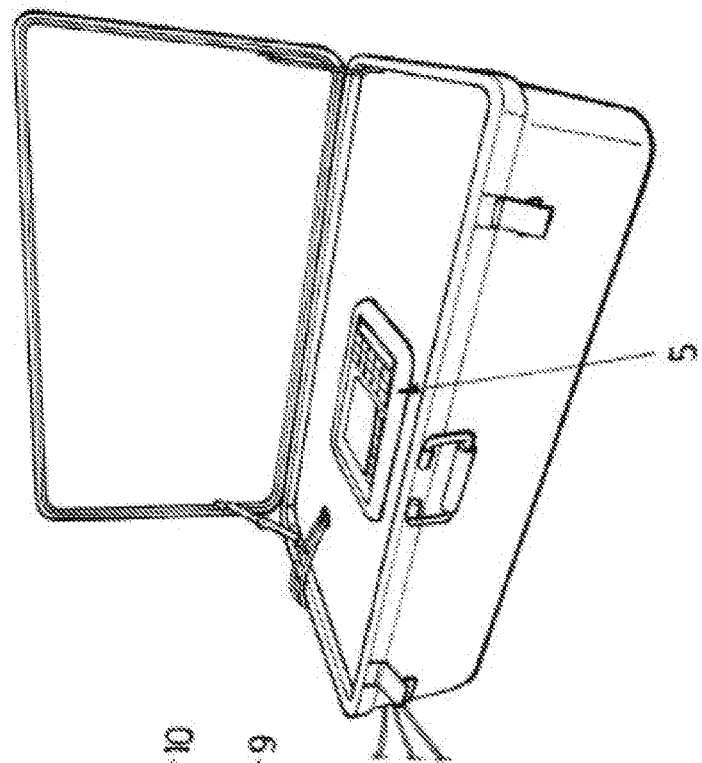
FIGS. 5a and 5b show a method to obtain the weight and the center of gravity by mean of jacks with load cells according to an embodiment of the present invention.
Figure 5A:
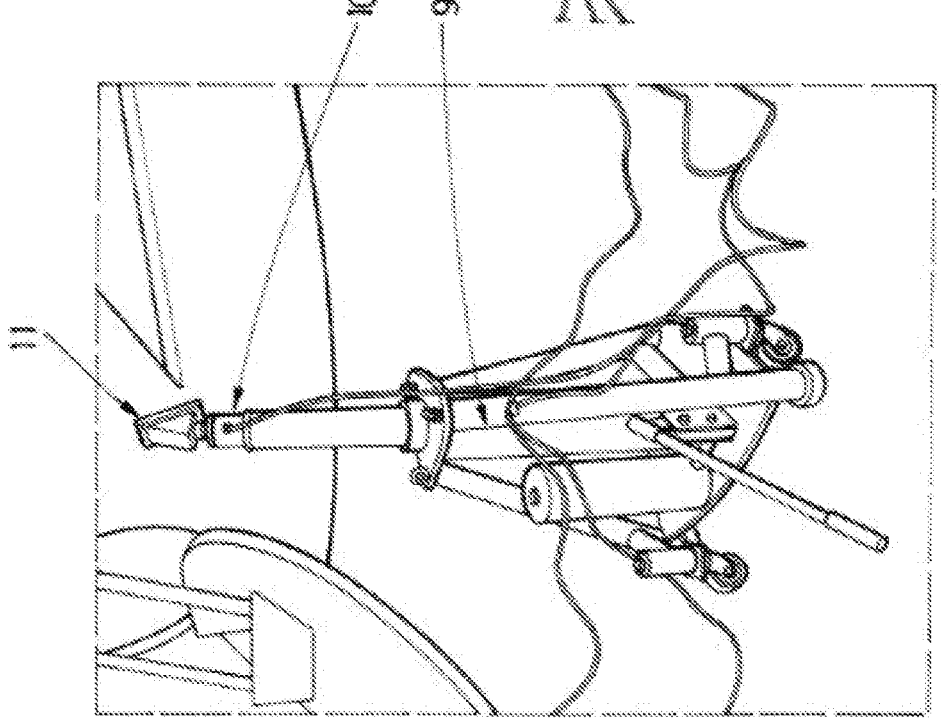

In these calibration steps, the weight ($W_i$) and the X-coordinate ($X_i$) of the position of the centre of gravity of the aircraft (6) in each loading state i have been measured with jacks with load cells as it is schematically shown in FIGS. 5a and 5b, wherein the load cell (10) is attached to the hydraulic jack (9) in a jacking point (11) in order to measure the real weight value ($W_i$) and real X-coordinate ($X_i$) of the centre of gravity of the aircraft (6) in each loading state i. The load cell (10) is connected to a weight indicator system (5) which registers the measures.

The following tables 2A-2E to 10A-10E show the weight ($W_i$), the X-coordinate ($X_i$) of the centre of gravity and the response of each sensor (the sensors are identified as "bridges") measured for each loading state i:

TABLE 2A

| CONFIGURATION 1: six loading states | | | | | | |
|---|---|---|---|---|---|---|
| Percentage of cargo | Weight (N) | X_CG (mm) | Bridge 01 (mV/V) | Bridge 02 (mV/V) | Bridge 03 (mV/V) | Bridge 04 (mV/V) |
| 33% | 111022.080 | 11117.346 | −0.590 | 0.022 | −1.503 | −0.250 |
| 66% | 117004.640 | 10835.995 | −0.597 | 0.024 | −1.518 | −0.247 |
| 100% | 122297.760 | 10614.656 | −0.604 | 0.027 | −1.542 | −0.241 |
| 66% | 115403.360 | 10948.294 | −0.607 | 0.028 | −1.549 | −0.243 |
| 33% | 110888.640 | 11164.416 | −0.603 | 0.031 | −1.570 | −0.224 |
| 0% | 103527.200 | 11424.708 | −0.586 | 0.032 | −1.537 | −0.219 |

TABLE 2B

| CONFIGURATION 1: six loading states | | | | | | |
|---|---|---|---|---|---|---|
| Percentage of cargo | Weight (N) | X_CG (mm) | Bridge 05 (mV/V) | Bridge 06 (mV/V) | Bridge 07 (mV/V) | Bridge 08 (mV/V) |
| 33% | 111022.080 | 11117.346 | −0.033 | −0.247 | −0.377 | −0.397 |
| 66% | 117004.640 | 10835.995 | −0.038 | −0.253 | −0.391 | −0.407 |
| 100% | 122297.760 | 10614.656 | −0.035 | −0.259 | −0.395 | −0.414 |
| 66% | 115403.360 | 10948.294 | −0.028 | −0.253 | −0.380 | −0.402 |
| 33% | 110888.640 | 11164.416 | −0.022 | −0.263 | −0.328 | −0.427 |
| 0% | 103527.200 | 11424.708 | −0.013 | −0.249 | −0.311 | −0.398 |

TABLE 2C

CONFIGURATION 1: six loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 33% | 111022.080 | 11117.346 | −0.607 | 0.005 | −1.433 | −0.087 |
| 66% | 117004.640 | 10835.995 | −0.614 | 0.005 | −1.450 | −0.086 |
| 100% | 122297.760 | 10614.656 | −0.626 | 0.012 | −1.489 | −0.064 |
| 66% | 115403.360 | 10948.294 | −0.628 | 0.009 | −1.497 | −0.069 |
| 33% | 110888.640 | 11164.416 | −0.611 | 0.007 | −1.443 | −0.086 |
| 0% | 103527.200 | 11424.708 | −0.593 | 0.007 | −1.418 | −0.080 |

TABLE 2D

CONFIGURATION 1: six loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 33% | 111022.080 | 11117.346 | −0.068 | −0.226 | −0.434 | −0.347 |
| 66% | 117004.640 | 10835.995 | −0.071 | −0.231 | −0.441 | −0.356 |
| 100% | 122297.760 | 10614.656 | −0.068 | −0.245 | −0.434 | −0.382 |
| 66% | 115403.360 | 10948.294 | −0.057 | −0.238 | −0.416 | −0.371 |
| 33% | 110888.640 | 11164.416 | −0.066 | −0.219 | −0.444 | −0.333 |
| 0% | 103527.200 | 11424.708 | −0.061 | −0.209 | −0.432 | −0.316 |

TABLE 2E

CONFIGURATION 1: six loading states

| Percentage of cargo | Weight (N) | X_CG (mm) | Bridge 17 (mV/V) | Bridge 18 (mV/V) | Bridge 19 (mV/V) |
|---|---|---|---|---|---|
| 33% | 111022.080 | 11117.346 | 1.915 | 1.042 | 1.080 |
| 66% | 117004.640 | 10835.995 | 2.335 | 1.294 | 1.289 |
| 100% | 122297.760 | 10614.656 | 2.895 | 1.627 | 1.611 |
| 66% | 115403.360 | 10948.294 | 2.317 | 1.334 | 1.372 |
| 33% | 110888.640 | 11164.416 | 1.860 | 1.012 | 1.045 |
| 0% | 103527.200 | 11424.708 | 1.460 | 0.798 | 0.882 |

TABLE 3A

CONFIGURATION 2: six loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 33% | 108686.880 | 11509.888 | −0.618 | 0.025 | −1.561 | −0.250 |
| 66% | 114157.920 | 11590.373 | −0.661 | 0.031 | −1.665 | −0.250 |
| 100% | 120162.720 | 11673.937 | −0.727 | 0.040 | −1.826 | −0.242 |
| 66% | 112734.560 | 11579.179 | −0.681 | 0.043 | −1.725 | −0.215 |
| 33% | 108086.400 | 11509.259 | −0.613 | 0.014 | −1.508 | −0.282 |
| 0% | 103349.280 | 11420.250 | −0.585 | 0.014 | −1.450 | −0.270 |

TABLE 3B

CONFIGURATION 2: six loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 33% | 108686.880 | 11509.888 | −0.030 | −0.253 | −0.387 | −0.403 |
| 66% | 114157.920 | 11590.373 | −0.037 | −0.278 | −0.421 | −0.443 |
| 100% | 120162.720 | 11673.937 | −0.043 | −0.321 | −0.454 | −0.503 |
| 66% | 112734.560 | 11579.179 | −0.029 | −0.309 | −0.418 | −0.471 |
| 33% | 108086.400 | 11509.259 | −0.047 | −0.244 | −0.460 | −0.369 |
| 0% | 103349.280 | 11420.250 | −0.038 | −0.232 | −0.437 | −0.341 |

TABLE 3C

CONFIGURATION 2: six loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 33% | 108686.880 | 11509.888 | −0.641 | 0.011 | −1.530 | −0.067 |
| 66% | 114157.920 | 11590.373 | −0.683 | 0.016 | −1.625 | −0.056 |
| 100% | 120162.720 | 11673.937 | −0.728 | 0.017 | −1.687 | −0.059 |
| 66% | 112734.560 | 11579.179 | −0.680 | 0.018 | −1.592 | −0.037 |
| 33% | 108086.400 | 11509.259 | −0.647 | 0.014 | −1.551 | −0.048 |
| 0% | 103349.280 | 11420.250 | −0.613 | 0.015 | −1.489 | −0.037 |

TABLE 3D

CONFIGURATION 2: six loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 33% | 108686.880 | 11509.888 | −0.060 | −0.240 | −0.404 | −0.384 |
| 66% | 114157.920 | 11590.373 | −0.069 | −0.262 | −0.435 | −0.416 |
| 100% | 120162.720 | 11673.937 | −0.098 | −0.279 | −0.575 | −0.386 |
| 66% | 112734.560 | 11579.179 | −0.083 | −0.267 | −0.540 | −0.367 |
| 33% | 108086.400 | 11509.259 | −0.065 | −0.258 | −0.373 | −0.414 |
| 0% | 103349.280 | 11420.250 | −0.056 | −0.247 | −0.353 | −0.393 |

TABLE 3E

CONFIGURATION 2: six loading states

| Percentage of cargo | Weight (N) | X_CG (mm) | Bridge 17 (mV/V) | Bridge 18 (mV/V) | Bridge 19 (mV/V) |
|---|---|---|---|---|---|
| 33% | 108686.880 | 11509.888 | 1.334 | 0.735 | 0.784 |
| 66% | 114157.920 | 11590.373 | 1.336 | 0.743 | 0.788 |
| 100% | 120162.720 | 11673.937 | 1.296 | 0.746 | 0.799 |
| 66% | 112734.560 | 11579.179 | 1.308 | 0.744 | 0.802 |
| 33% | 108086.400 | 11509.259 | 1.374 | 0.771 | 0.822 |
| 0% | 103349.280 | 11420.250 | 1.404 | 0.786 | 0.836 |

TABLE 4A

CONFIGURATION 3: six loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 33% | 109198.400 | 11162.881 | −0.560 | 0.014 | −1.417 | −0.270 |
| 66% | 115136.480 | 10924.562 | −0.553 | 0.018 | −1.404 | −0.261 |
| 100% | 120385.120 | 10738.966 | −0.548 | 0.017 | −1.388 | −0.263 |
| 66% | 115069.760 | 10940.000 | −0.558 | 0.017 | −1.414 | −0.266 |
| 33% | 109554.240 | 11157.164 | −0.563 | 0.015 | −1.431 | −0.265 |
| 0% | 104149.920 | 11395.553 | −0.568 | 0.016 | −1.446 | −0.264 |

TABLE 4B

CONFIGURATION 3: six loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 33% | 109198.400 | 11162.881 | −0.044 | −0.208 | −0.449 | −0.320 |
| 66% | 115136.480 | 10924.562 | −0.048 | −0.214 | −0.460 | −0.334 |
| 100% | 120385.120 | 10738.966 | −0.053 | −0.194 | −0.481 | −0.296 |
| 66% | 115069.760 | 10940.000 | −0.049 | −0.190 | −0.484 | −0.289 |
| 33% | 109554.240 | 11157.164 | −0.034 | −0.220 | −0.398 | −0.352 |
| 0% | 104149.920 | 11395.553 | −0.033 | −0.215 | −0.400 | −0.343 |

TABLE 4C

CONFIGURATION 3: six loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 33% | 109198.400 | 11162.881 | −0.634 | 0.015 | −1.549 | −0.050 |
| 66% | 115136.480 | 10924.562 | −0.663 | 0.018 | −1.612 | −0.041 |
| 100% | 120385.120 | 10738.966 | −0.690 | 0.021 | −1.657 | −0.037 |
| 66% | 115069.760 | 10940.000 | −0.670 | 0.020 | −1.628 | −0.039 |
| 33% | 109554.240 | 11157.164 | −0.632 | 0.014 | −1.525 | −0.056 |
| 0% | 104149.920 | 11395.553 | −0.614 | 0.010 | −1.495 | −0.066 |

TABLE 4D

CONFIGURATION 3: six loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 33% | 109198.400 | 11162.881 | −0.058 | −0.249 | −0.370 | −0.412 |
| 66% | 115136.480 | 10924.562 | −0.067 | −0.270 | −0.399 | −0.444 |
| 100% | 120385.120 | 10738.966 | −0.078 | −0.285 | −0.472 | −0.442 |
| 66% | 115069.760 | 10940.000 | −0.067 | −0.276 | −0.443 | −0.425 |
| 33% | 109554.240 | 11157.164 | −0.056 | −0.252 | −0.369 | −0.418 |
| 0% | 104149.920 | 11395.553 | −0.040 | −0.236 | −0.330 | −0.395 |

TABLE 4E

CONFIGURATION 3: six loading states

| Percentage of cargo | Weight (N) | X_CG (mm) | Bridge 17 (mV/V) | Bridge 18 (mV/V) | Bridge 19 (mV/V) |
|---|---|---|---|---|---|
| 33% | 109198.400 | 11162.881 | 1.804 | 1.004 | 1.019 |
| 66% | 115136.480 | 10924.562 | 2.243 | 1.261 | 1.239 |
| 100% | 120385.120 | 10738.966 | 2.656 | 1.517 | 1.461 |
| 66% | 115069.760 | 10940.000 | 2.305 | 1.352 | 1.331 |
| 33% | 109554.240 | 11157.164 | 1.856 | 1.040 | 1.044 |
| 0% | 104149.920 | 11395.553 | 1.494 | 0.855 | 0.906 |

TABLE 5A

CONFIGURATION 4: five loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 33% | 115381.120 | 11364.245 | −0.662 | 0.030 | −1.679 | −0.250 |
| 66% | 127168.320 | 11344.276 | −0.745 | 0.042 | −1.871 | −0.248 |
| 100% | 138221.600 | 11320.850 | −0.828 | 0.052 | −2.046 | −0.250 |
| 50% | 121719.520 | 11381.470 | −0.735 | 0.049 | −1.835 | −0.222 |
| 0% | 103972.000 | 11414.744 | −0.587 | 0.029 | −1.540 | −0.229 |

TABLE 5B

CONFIGURATION 4: five loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 33% | 115381.120 | 11364.245 | −0.034 | −0.293 | −0.398 | −0.465 |
| 66% | 127168.320 | 11344.276 | −0.051 | −0.350 | −0.479 | −0.550 |
| 100% | 138221.600 | 11320.850 | −0.074 | −0.403 | −0.577 | −0.629 |
| 50% | 121719.520 | 11381.470 | −0.035 | −0.355 | −0.495 | −0.538 |
| 0% | 103972.000 | 11414.744 | −0.029 | −0.235 | −0.348 | −0.379 |

TABLE 5C

CONFIGURATION 4: five loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 33% | 115381.120 | 11364.245 | −0.650 | 0.010 | −1.527 | −0.079 |
| 66% | 127168.320 | 11344.276 | −0.703 | 0.016 | −1.648 | −0.064 |
| 100% | 138221.600 | 11320.850 | −0.759 | 0.030 | −1.794 | −0.014 |
| 50% | 121719.520 | 11381.470 | −0.694 | 0.032 | −1.672 | 0.004 |
| 0% | 103972.000 | 11414.744 | −0.596 | 0.005 | −1.418 | −0.096 |

TABLE 5D

CONFIGURATION 4: five loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 33% | 115381.120 | 11364.245 | −0.069 | −0.244 | −0.445 | −0.374 |
| 66% | 127168.320 | 11344.276 | −0.079 | −0.275 | −0.485 | −0.420 |
| 100% | 138221.600 | 11320.850 | −0.077 | −0.316 | −0.478 | −0.495 |
| 50% | 121719.520 | 11381.470 | −0.060 | −0.294 | −0.444 | −0.454 |
| 0% | 103972.000 | 11414.744 | −0.069 | −0.198 | −0.471 | −0.285 |

TABLE 5E

CONFIGURATION 4: five loading states

| Percentage of cargo | Weight (N) | X_CG (mm) | Bridge 17 (mV/V) | Bridge 18 (mV/V) | Bridge 19 (mV/V) |
|---|---|---|---|---|---|
| 33% | 115381.120 | 11364.245 | 1.692 | 1.010 | 1.010 |
| 66% | 127168.320 | 11344.276 | 1.885 | 1.107 | 1.087 |
| 100% | 138221.600 | 11320.850 | 2.017 | 1.161 | 1.153 |
| 50% | 121719.520 | 11381.470 | 1.692 | 0.998 | 1.030 |
| 0% | 103972.000 | 11414.744 | 1.417 | 0.823 | 0.820 |

TABLE 6A

CONFIGURATION 5: six loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 0% | 103972.000 | 11414.744 | −0.588 | 0.029 | −1.542 | −0.228 |
| 33% | 115603.520 | 11301.925 | −0.649 | 0.037 | −1.683 | −0.233 |
| 66% | 126567.840 | 11224.119 | −0.702 | 0.040 | −1.773 | −0.243 |
| 100% | 135508.320 | 11150.887 | −0.754 | 0.049 | −1.892 | −0.237 |
| 50% | 119717.920 | 11267.787 | −0.674 | 0.038 | −1.723 | −0.239 |
| 0% | 102370.720 | 11424.841 | −0.601 | 0.035 | −1.551 | −0.210 |

TABLE 6B

CONFIGURATION 5: six loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 0% | 103972.000 | 11414.744 | −0.029 | −0.234 | −0.350 | −0.379 |
| 33% | 115603.520 | 11301.925 | −0.035 | −0.274 | −0.399 | −0.440 |
| 66% | 126567.840 | 11224.119 | −0.036 | −0.315 | −0.429 | −0.503 |
| 100% | 135508.320 | 11150.887 | −0.048 | −0.353 | −0.484 | −0.562 |
| 50% | 119717.920 | 11267.787 | −0.037 | −0.299 | −0.412 | −0.476 |
| 0% | 102370.720 | 11424.841 | −0.010 | −0.258 | −0.344 | −0.408 |

TABLE 6C

CONFIGURATION 5: six loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 0% | 103972.000 | 11414.744 | −0.597 | 0.005 | −1.420 | −0.095 |
| 33% | 115603.520 | 11301.925 | −0.659 | 0.012 | −1.557 | −0.081 |
| 66% | 126567.840 | 11224.119 | −0.721 | 0.022 | −1.685 | −0.046 |
| 100% | 135508.320 | 11150.887 | −0.766 | 0.029 | −1.782 | −0.028 |
| 50% | 119717.920 | 11267.787 | −0.686 | 0.020 | −1.620 | −0.053 |
| 0% | 102370.720 | 11424.841 | −0.600 | 0.018 | −1.445 | −0.035 |

TABLE 6D

CONFIGURATION 5: six loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 0% | 103972.000 | 11414.744 | −0.070 | −0.197 | −0.472 | −0.284 |
| 33% | 115603.520 | 11301.925 | −0.078 | −0.234 | −0.516 | −0.339 |
| 66% | 126567.840 | 11224.119 | −0.080 | −0.295 | −0.509 | −0.445 |
| 100% | 135508.320 | 11150.887 | −0.092 | −0.325 | −0.547 | −0.491 |
| 50% | 119717.920 | 11267.787 | −0.076 | −0.264 | −0.480 | −0.400 |
| 0% | 102370.720 | 11424.841 | −0.057 | −0.230 | −0.427 | −0.339 |

TABLE 6E

CONFIGURATION 5: six loading states

| Percentage of cargo | Weight (N) | X_CG (mm) | Bridge 17 (mV/V) | Bridge 18 (mV/V) | Bridge 19 (mV/V) |
|---|---|---|---|---|---|
| 0% | 103972.000 | 11414.744 | 1.422 | 0.760 | 0.822 |
| 33% | 115603.520 | 11301.925 | 1.756 | 0.949 | 0.988 |
| 66% | 126567.840 | 11224.119 | 2.012 | 1.111 | 1.131 |
| 100% | 135508.320 | 11150.887 | 2.283 | 1.265 | 1.266 |
| 50% | 119717.920 | 11267.787 | 1.901 | 1.069 | 1.129 |
| 0% | 102370.720 | 11424.841 | 1.411 | 0.778 | 0.867 |

TABLE 7A

CONFIGURATION 6: six loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 0% | 102370.720 | 11424.841 | −0.599 | 0.034 | −1.552 | −0.212 |
| 33% | 114091.200 | 11544.014 | −0.705 | 0.044 | −1.827 | −0.223 |
| 66% | 125878.400 | 11630.835 | −0.804 | 0.058 | −2.047 | −0.217 |
| 90% | 135019.040 | 11692.424 | −0.900 | 0.070 | −2.245 | −0.223 |
| 50% | 120184.960 | 11586.200 | −0.779 | 0.065 | −1.964 | −0.183 |
| 0% | 102192.800 | 11423.009 | −0.570 | 0.022 | −1.480 | −0.245 |

TABLE 7B

CONFIGURATION 6: six loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 0% | 102370.720 | 11424.841 | −0.009 | −0.257 | −0.344 | −0.408 |
| 33% | 114091.200 | 11544.014 | −0.036 | −0.311 | −0.414 | −0.502 |
| 66% | 125878.400 | 11630.835 | −0.058 | −0.383 | −0.518 | −0.611 |
| 90% | 135019.040 | 11692.424 | −0.077 | −0.444 | −0.635 | −0.698 |
| 50% | 120184.960 | 11586.200 | −0.034 | −0.384 | −0.524 | −0.579 |
| 0% | 102192.800 | 11423.009 | −0.024 | −0.223 | −0.346 | −0.366 |

TABLE 7C

CONFIGURATION 6: six loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 0% | 102370.720 | 11424.841 | −0.599 | 0.019 | −1.446 | −0.036 |
| 33% | 114091.200 | 11544.014 | −0.632 | 0.004 | −1.463 | −0.109 |
| 66% | 125878.400 | 11630.835 | −0.650 | 0.006 | −1.509 | −0.111 |
| 90% | 135019.040 | 11692.424 | −0.732 | 0.027 | −1.709 | −0.043 |
| 50% | 120184.960 | 11586.200 | −0.678 | 0.029 | −1.606 | −0.016 |
| 0% | 102192.800 | 11423.009 | −0.585 | 0.003 | −1.373 | −0.100 |

TABLE 7D

CONFIGURATION 6: six loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 0% | 102370.720 | 11424.841 | −0.056 | −0.228 | −0.427 | −0.339 |
| 33% | 114091.200 | 11544.014 | −0.087 | −0.204 | −0.571 | −0.252 |
| 66% | 125878.400 | 11630.835 | −0.086 | −0.214 | −0.577 | −0.270 |
| 90% | 135019.040 | 11692.424 | −0.079 | −0.256 | −0.562 | −0.363 |
| 50% | 120184.960 | 11586.200 | −0.065 | −0.244 | −0.532 | −0.337 |
| 0% | 102192.800 | 11423.009 | −0.058 | −0.194 | −0.445 | −0.288 |

TABLE 7E

CONFIGURATION 6: six loading states

| Percentage of cargo | Weight (N) | X_CG (mm) | Bridge 17 (mV/V) | Bridge 18 (mV/V) | Bridge 19 (mV/V) |
|---|---|---|---|---|---|
| 0% | 102370.720 | 11424.841 | 1.410 | 0.796 | 0.870 |
| 33% | 114091.200 | 11544.014 | 1.359 | 0.753 | 0.794 |
| 66% | 125878.400 | 11630.835 | 1.481 | 0.821 | 0.859 |
| 100% | 135019.040 | 11692.424 | 1.349 | 0.725 | 0.805 |
| 50% | 120184.960 | 11586.200 | 1.350 | 0.743 | 0.816 |
| 0% | 102192.800 | 11423.009 | 1.363 | 0.749 | 0.797 |

TABLE 8A

CONFIGURATION 7: six loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 0% | 102192.800 | 11423.009 | −0.575 | 0.017 | −1.478 | −0.247 |
| 33% | 113735.360 | 11509.838 | −0.652 | 0.026 | −1.655 | −0.255 |
| 66% | 124988.800 | 11572.303 | −0.732 | 0.040 | −1.833 | −0.250 |
| 100% | 136397.920 | 11632.690 | −0.810 | 0.052 | −2.008 | −0.246 |
| 50% | 119740.160 | 11552.059 | −0.694 | 0.030 | −1.730 | −0.269 |
| 0% | 102392.960 | 11412.718 | −0.594 | 0.024 | −1.498 | −0.234 |

TABLE 8B

CONFIGURATION 7: six loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 0% | 102192.800 | 11423.009 | −0.030 | −0.227 | −0.347 | −0.365 |
| 33% | 113735.360 | 11509.838 | −0.037 | −0.276 | −0.401 | −0.436 |
| 66% | 124988.800 | 11572.303 | −0.046 | −0.322 | −0.468 | −0.503 |
| 100% | 136397.920 | 11632.690 | −0.061 | −0.373 | −0.538 | −0.583 |
| 50% | 119740.160 | 11552.059 | −0.052 | −0.282 | −0.501 | −0.441 |
| 0% | 102392.960 | 11412.718 | −0.023 | −0.233 | −0.418 | −0.355 |

TABLE 8C

CONFIGURATION 7: six loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 0% | 102192.800 | 11423.009 | −0.587 | −0.001 | −1.372 | −0.102 |
| 33% | 113735.360 | 11509.838 | −0.663 | 0.006 | −1.546 | −0.090 |
| 66% | 124988.800 | 11572.303 | −0.749 | 0.021 | −1.743 | −0.045 |
| 100% | 136397.920 | 11632.690 | −0.826 | 0.032 | −1.905 | −0.017 |
| 50% | 119740.160 | 11552.059 | −0.721 | 0.027 | −1.721 | −0.017 |
| 0% | 102392.960 | 11412.718 | −0.607 | 0.022 | −1.492 | −0.010 |

TABLE 8D

CONFIGURATION 7: six loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 0% | 102192.800 | 11423.009 | −0.068 | −0.201 | −0.447 | −0.287 |
| 33% | 113735.360 | 11509.838 | −0.078 | −0.240 | −0.492 | −0.350 |
| 66% | 124988.800 | 11572.303 | −0.085 | −0.291 | −0.536 | −0.428 |
| 100% | 136397.920 | 11632.690 | −0.101 | −0.339 | −0.596 | −0.497 |
| 50% | 119740.160 | 11552.059 | −0.072 | −0.282 | −0.457 | −0.442 |
| 0% | 102392.960 | 11412.718 | −0.046 | −0.233 | −0.387 | −0.362 |

TABLE 8E

CONFIGURATION 7: six loading states

| Percentage of cargo | Weight (N) | X_CG (mm) | Bridge 17 (mV/V) | Bridge 18 (mV/V) | Bridge 19 (mV/V) |
|---|---|---|---|---|---|
| 0% | 102192.800 | 11423.009 | 1.367 | 0.729 | 0.793 |
| 33% | 113735.360 | 11509.838 | 1.427 | 0.755 | 0.817 |
| 66% | 124988.800 | 11572.303 | 1.436 | 0.762 | 0.831 |
| 100% | 136397.920 | 11632.690 | 1.481 | 0.787 | 0.851 |
| 50% | 119740.160 | 11552.059 | 1.422 | 0.741 | 0.824 |
| 0% | 102392.960 | 11412.718 | 1.363 | 0.724 | 0.808 |

TABLE 9A

CONFIGURATION 8: five loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 0% | 102392.960 | 11412.718 | −0.594 | 0.026 | −1.497 | −0.236 |
| 50% | 111555.840 | 11324.863 | −0.589 | 0.019 | −1.489 | −0.262 |
| 100% | 119540.000 | 11263.699 | −0.621 | 0.026 | −1.583 | −0.246 |
| 50% | 111066.560 | 11341.331 | −0.609 | 0.028 | −1.568 | −0.237 |
| 0% | 102170.560 | 11411.070 | −0.568 | 0.011 | −1.435 | −0.266 |

TABLE 9B

CONFIGURATION 8: five loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 0% | 102392.960 | 11412.718 | −0.021 | −0.232 | −0.417 | −0.354 |
| 50% | 111555.840 | 11324.863 | −0.034 | −0.230 | −0.393 | −0.362 |
| 100% | 119540.000 | 11263.699 | −0.030 | −0.258 | −0.361 | −0.410 |
| 50% | 111066.560 | 11341.331 | −0.023 | −0.251 | −0.352 | −0.388 |
| 0% | 102170.560 | 11411.070 | −0.032 | −0.228 | −0.356 | −0.362 |

TABLE 9C

CONFIGURATION 8: five loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 0% | 102392.960 | 11412.718 | −0.607 | 0.023 | −1.492 | −0.012 |
| 50% | 111555.840 | 11324.863 | −0.668 | 0.011 | −1.577 | −0.071 |
| 100% | 119540.000 | 11263.699 | −0.732 | 0.018 | −1.707 | −0.048 |
| 50% | 111066.560 | 11341.331 | −0.673 | 0.020 | −1.587 | −0.033 |
| 0% | 102170.560 | 11411.070 | −0.595 | 0.004 | −1.423 | −0.082 |

TABLE 9D

CONFIGURATION 8: five loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 0% | 102392.960 | 11412.718 | −0.044 | −0.232 | −0.384 | −0.362 |
| 50% | 111555.840 | 11324.863 | −0.066 | −0.259 | −0.432 | −0.407 |
| 100% | 119540.000 | 11263.699 | −0.093 | −0.309 | −0.516 | −0.462 |
| 50% | 111066.560 | 11341.331 | −0.072 | −0.290 | −0.466 | −0.430 |
| 0% | 102170.560 | 11411.070 | −0.057 | −0.225 | −0.334 | −0.374 |

TABLE 9E

CONFIGURATION 8: five loading states

| Percentage of cargo | Weight (N) | X_CG (mm) | Bridge 17 (mV/V) | Bridge 18 (mV/V) | Bridge 19 (mV/V) |
|---|---|---|---|---|---|
| 0% | 102392.960 | 11412.718 | 1.376 | 0.724 | 0.819 |
| 50% | 111555.840 | 11324.863 | 1.640 | 0.874 | 0.932 |
| 100% | 119540.000 | 11263.699 | 1.863 | 1.017 | 1.043 |
| 50% | 111066.560 | 11341.331 | 1.649 | 0.918 | 0.970 |
| 0% | 102170.560 | 11411.070 | 1.389 | 0.729 | 0.818 |

TABLE 10A

CONFIGURATION 9: five loading states

| Percentage of cargo | Weight (N) | X_CG (mm) | Bridge 01 (mV/V) | Bridge 02 (mV/V) | Bridge 03 (mV/V) | Bridge 04 (mV/V) |
|---|---|---|---|---|---|---|
| 0% | 102122.100 | 11412.858 | −0.562 | 0.016 | −1.443 | −0.259 |
| 50% | 147150.000 | 11409.637 | −0.841 | 0.058 | −2.068 | −0.251 |
| 100% | 185801.400 | 11399.015 | −1.075 | 0.103 | −2.583 | −0.189 |
| 50% | 145580.400 | 11431.630 | −0.856 | 0.074 | −2.081 | −0.187 |
| 0% | 102612.600 | 11400.263 | −0.602 | 0.036 | −1.505 | −0.222 |

TABLE 10B

CONFIGURATION 9: five loading states

| Percentage of cargo | Weight (N) | X_CG (mm) | Bridge 05 (mV/V) | Bridge 06 (mV/V) | Bridge 07 (mV/V) | Bridge 08 (mV/V) |
|---|---|---|---|---|---|---|
| 0% | 102122.100 | 11412.858 | −0.028 | −0.228 | −0.361 | −0.366 |
| 50% | 147150.000 | 11409.637 | −0.073 | −0.419 | −0.595 | −0.650 |
| 100% | 185801.400 | 11399.015 | −0.138 | −0.605 | −0.840 | −0.923 |
| 50% | 145580.400 | 11431.630 | −0.049 | −0.460 | −0.608 | −0.680 |
| 0% | 102612.600 | 11400.263 | −0.006 | −0.253 | −0.369 | −0.383 |

TABLE 10C

CONFIGURATION 9: five loading states

| Percentage of cargo | Weight (N) | X_CG (mm) | Bridge 09 (mV/V) | Bridge 10 (mV/V) | Bridge 11 (mV/V) | Bridge 12 (mV/V) |
|---|---|---|---|---|---|---|
| 0% | 102122.100 | 11412.858 | −0.593 | 0.009 | −1.430 | −0.072 |
| 50% | 147150.000 | 11409.637 | −0.876 | 0.049 | −2.036 | 0.036 |
| 100% | 185801.400 | 11399.015 | −1.111 | 0.094 | −2.515 | 0.170 |
| 50% | 145580.400 | 11431.630 | −0.871 | 0.064 | −2.025 | 0.105 |
| 0% | 102612.600 | 11400.263 | −0.606 | 0.026 | −1.486 | −0.015 |

TABLE 10D

CONFIGURATION 9: five loading states

| Percentage of cargo | Weight (N) | X_CG (mm) | Bridge 13 (mV/V) | Bridge 14 (mV/V) | Bridge 15 (mV/V) | Bridge 16 (mV/V) |
|---|---|---|---|---|---|---|
| 0% | 102122.100 | 11412.858 | −0.049 | −0.223 | −0.338 | −0.377 |
| 50% | 147150.000 | 11409.637 | −0.102 | −0.408 | −0.582 | −0.629 |
| 100% | 185801.400 | 11399.015 | −0.167 | −0.580 | −0.840 | −0.852 |
| 50% | 145580.400 | 11431.630 | −0.084 | −0.432 | −0.614 | −0.647 |
| 0% | 102612.600 | 11400.263 | −0.033 | −0.241 | −0.378 | −0.404 |

TABLE 10E

CONFIGURATION 9: five loading states

| Percentage of cargo | Weight (N) | X_CG (mm) | Bridge 17 (mV/V) | Bridge 18 (mV/V) | Bridge 19 (mV/V) |
|---|---|---|---|---|---|
| 0% | 102122.100 | 11412.858 | 1.402 | 0.746 | 0.824 |
| 50% | 147150.000 | 11409.637 | 1.993 | 1.088 | 1.117 |
| 100% | 185801.400 | 11399.015 | 2.415 | 1.330 | 1.335 |
| 50% | 145580.400 | 11431.630 | 1.979 | 1.109 | 1.168 |
| 0% | 102612.600 | 11400.263 | 1.422 | 0.786 | 0.891 |

Considering all the filling percentages, a total of 51 loading states were obtained.

Once the measurements of each sensor (4) were obtained according to each loading state i, the following calibration steps were performed:

v) Groups of four calibration sensors ($N_w=4$) were formed and for each group an equation system with a number of equations P=51 was solved by least squares. Also, groups of three calibration sensors ($N_w=3$) were formed and for each group an equation system with a number of equations P=51 was also solved by least squares. In this example, all the combinations of 3 sensors and 4 sensors were considered. For each group of sensors the weight coefficients $\beta_n$ for n=1, ..., 4 and for n=1, ..., 3 were obtained, respectively.

vi) The estimated weight ($We_i$) for each loading state i and the first probable error ($PE_w$) were determined for each group of 4 and 3 sensors ($N_w=4$, $N_w=3$) using the measured responses and the obtained weight coefficients.

Below are shown several (not all) equations obtained in steps v) and vi) for some of the groups of four sensors ($N_w=4$) and the first probable error ($PE_w$) obtained for said groups:

$$We^{Eq1}=(-86556.3\times\mu^{bridge1})+(-73945.4\times\mu^{bridge2})+(-63713.4\times\mu^{bridge9})+(11350.0\times\mu^{bridge17}) \quad \text{Equation 1:}$$

First probable error for Equation 1: $PE_w=736.0$ $$We^{Eq2}=(-72791.4\times\mu^{bridge1})+(-75957.2\times\mu^{bridge9})+(-65926.8\phantom{X}65926.8\times\mu^{bridge10})+(11083.7\times\mu^{bridge17}) \quad \text{Equation 2:}$$

First probable error for Equation 2: $PE_w=684.3$ $$We^{Eq3}=(-29698.7\times\mu^{bridge3})+(-75203.4\times\mu^{bridge9})+(24293.0\times\mu^{bridge17})+(-25100.2\times\mu^{bridge19}) \quad \text{Equation 3:}$$

First probable error for Equation 3: $PE_w=713.8$ $$We^{Eq4}=(-28387.9\times\mu^{bridge3})+(-44809.5\times\mu^{bridge5})+(-72570.8\times\mu^{bridge9})+(11039.6\times\mu^{bridge17}) \quad \text{Equation 4:}$$

First probable error for Equation 4: $PE_w=704.4$ $$We^{Eq5}=(-85744.5\times\mu^{bridge1})+(-81280.3\times\mu^{bridge2})+(-67149.1\times\mu^{bridge9})+(18817.2\times\mu^{bridge18}) \quad \text{Equation 5:}$$

First probable error for Equation 5: $PE_w=935.3$ $$We^{Eq6}=(-80364.5\times\mu^{bridge1})+(-57544.1\times\mu^{bridge2})+(-67523.6\times\mu^{bridge9})+(20592.7\times\mu\text{bridge 19}) \quad \text{Equation 6:}$$

First probable error for Equation 6: $PE_w=1036.4$ $$We^{Eq7}=(-156095.0\times\mu^{bridge1})+(-335755.3\times\mu^{bridge2})+(181157.1\times\mu^{bridge10})+(23123.7\times\mu^{bridge18}) \quad \text{Equation 7:}$$

First probable error for Equation 7: $PE_w=1749.8$ wherein $We^{Eq1}$ denotes an estimated weight obtained with a first combination of sensors, namely sensors 1, 2, 9 and 17, and wherein the first probable error ($PE_w$) has been obtained for each group of sensors according to the following expression $$PE_w = C_E \sqrt{\frac{\sum_{i=1}^{s}(We_i - W_i)^2}{s-(N_w+1)}}$$

with s=51, $N_w$=4, and $C_E$=0.6745, i denoting the loading state. In this particular example, the obtained weight constant $C_w$ in the above equations is 0.

From the above results, equations 2 and 4 were selected due to their lower values for the first probable error. The sensors corresponding to said equations are sensors 1, 9, 10 and 17 for equation 2 and sensors 3, 5, 9 and 17 for equation 4.

Below are shown several (not all) equations obtained in the steps v) and vi) for some of the groups of three sensors ($N_w$=3) and the first probable error ($PE_w$) obtained for said groups:

$We^{Eq1}=(-67486.3\times\mu^{bridge1})+(-141344.7\times\mu^{bridge2})+(-114424.1\times\mu^{bridge9})$  Equation 1:

First probable error for Equation 1: $PE_w$=2989.5

$We^{Eq2}=(-67642.3\times\mu^{bridge1})+(-74448.0\times\mu^{bridge2})+(-46822.8\times\mu^{bridge11})$  Equation 2:

First probable error for Equation 2: $PE_w$=3142.9

$We^{Eq3}=(-74227.1\times\mu^{bridge1})+(-71078.6\times\mu^{bridge9})+(11693.7\times\mu^{bridge17})$  Equation 3:

First probable error for Equation 3: $PE_w$=899.9

$We^{Eq4}=(-42357.3\times\mu^{bridge1})+(-132662.4\times\mu^{bridge9})+(9092.1\times\mu^{bridge13})$  Equation 4:

First probable error for Equation 4: $PE_w$=3159.1

$We^{Eq5}=(-125553.4\times\mu^{bridge1})+(-87136.1\times\mu^{bridge7})+(-253449.0\times\mu^{bridge10})$  Equation 5:

First probable error for Equation 5: $PE_w$=5497.9

$We^{Eq6}=(-28267.7\times\mu^{bridge3})+(-75931.5\times\mu^{bridge9})+(10896.8\times\mu^{bridge17})$  Equation 6:

First probable error for Equation 6: $PE_w$=856.5 wherein the first probable error ($PE_w$) has been obtained for each group of sensors according to the following expression $$PE_w = C_E \sqrt{\frac{\sum_{i=1}^{s}(We_i - W_i)^2}{s-(N_w+1)}}$$

with s=51, $N_w$=3, and $C_E$=0.6745, i denoting the loading state.

From the above results, equations 3 and 6 were selected due to their lower values for the probable error. The sensors corresponding to said equations are sensors 1, 9 and 17 for equation 3 and sensors 3, 9 and 17 for equation 6.

vii) Four first groups of sensors were selected from the plurality of calibration sensors (4) according to the first probable errors ($PE_w$) previously determined for each group of sensors ($N_w$=4, $N_w$=3). The sensors included in said four groups are sensors 1, 3, 5, 9, 10, and 17. Said six sensors (4) are thus selected as the installed sensors usable for determining the weight (W) of the aircraft (6). Once performed the calibration steps, the determination of the weight (W) of the aircraft (6) can be performed based on the responses of the sensors according to one or several of the following expressions:

$We^{App1}=(-72791.4\times\mu^{bridge1})+(-75957.2\times\mu^{bridge9})+(-65926.8\times\mu^{bridge10})+(11083.7\times\mu^{bridge17})$  Approach 1:

$We^{App2}=(-28387.9\times\mu^{bridge3})+(-44809.5\times\mu^{bridge5})+(-72570.8\times\mu^{bridge9})+(11039.6\times\mu^{bridge17})$  Approach 2:

$We^{App3}=(-74227.1\times\mu^{bridge1})+(-71078\times\mu^{bridge9})+(11693.7\times\mu^{bridge17})$  Approach 3:

$We^{App4}=(-28267.7\times\mu^{bridge3})+(-75931.5\times\mu^{bridge9})+(10896.8\times\mu^{bridge17})$  Approach 4:

In a preferred embodiment at least two groups of sensors having different number of sensors are selected.

The following calibration steps were performed to obtain the X-coordinate of the centre of gravity:

viii) Groups of four calibration sensors ($N_x$=4) were formed and for each group an equation system with a number of equations P=51 was solved by least squares. Also, groups of three calibration sensors ($N_x$=3) were formed and for each group an equation system with a number of equation P=51 was also solved by least squares. For each group of sensors, the X-coordinate coefficients $\gamma_n$ for n=1, ..., 4, and for n=1, ..., 3, and the constant $C_x$ were obtained, respectively.

ix) The estimated X-coordinate ($Xe_i$) for each loading state i and the second probable error ($PE_x$) were determined for each group of 4 and 3 sensors ($N_x$=4, $N_x$=3) using the measured responses, the obtained X-coordinate coefficients and the obtained X-constant $C_x$.

Below are shown several (not all) equations obtained in steps viii) and ix) for some of the groups of four sensors ($N_x$=4) and the second probable error ($PE_x$) obtained for said groups:

$Xe^{Eq1}=(-2501.7\times\mu^{bridge5})+(-299.5\times\mu^{bridge7})+(2695.3\times\mu^{bridge10})+(-1031.6\times\mu^{bridge19})+12040.8$  Equation 1:

Second probable error for Equation 1: $PE_x$=48.0

$Xe^{Eq2}=(-498.6\times\mu^{bridge5})+(-569.2\times\mu^{bridge8})+(-654.5\times\mu^{bridge9})+(-979.6\times\mu^{bridge19})+11555.4$  Equation 2:

Second probable error for Equation 2: $PE_x$=31.3

$Xe^{Eq3}=(-2330.6\times\mu^{bridge13})+(-580.9\times\mu^{bridge15})+(-953.6\times\mu^{bridge17})+(616.9\times\mu^{bridge19})+11934.0$  Equation 3:

Second probable error for Equation 3: $PE_x$=38.4

$Xe^{Eq4}=(-17814.8\times\mu^{bridge1})+(4114.3\times\mu^{bridge7})+(12056.8\times\mu^{bridge8})+(1118.8\times\mu^{bridge11})+8539.4$  Equation 4:

Second/probable error for Equation 4: $PE_x$=98.4

$Xe^{Eq5}=(-302.2\times\mu^{bridge3})+(-2523.8\times\mu^{bridge10})+(-393.1\times\mu^{bridge11})+(-570.3\times\mu^{bridge17})+11223.3$  Equation 5:

Second probable error for Equation 5: $PE_x$=16.6

$Xe^{Eq6}=(-272.6\times\mu^{bridge3})+(-807.4\times\mu^{bridge9})+(-1508.3\times\mu^{bridge10})+(-571.7\times\mu^{bridge17})+11341.5$  Equation 6:

Second probable error for Equation 6: $PE_x$=16.7 wherein $Xe^{Eq1}$ denotes an estimated X-coordinate obtained with a first combination of sensors, namely sensors 5, 7, 10 and 19, and wherein the second probable error ($PE_x$) has been obtained for each group of sensors according to the following expression $$PE_X = C_E \sqrt{\frac{\sum_{i=1}^{s}(Xe_i - X_i)^2}{s-(N_x+1)}}$$

with s=51, $N_w$=4 and $C_E$=0.6745, i denoting the loading state.

From the above results, the equations 5 and 6 were selected due to their lower values for the probable error. The sensors (4) corresponding to said equations are sensors 3, 10, 11 and 17 for equation 5 and sensors 3, 9, 10 and 17 for equation 4.

Below are shown several (not all) equations obtained in the steps viii) and ix) for some of the groups of three sensors ($N_x$=3) and the second probable error $PE_X$ obtained for said groups:

$$Xe^{Eq1}=(-274.9\times\mu^{bridge3})+(-632.6\times\mu^{bridge9})+(-570.8\times\mu^{bridge17})+11428.6 \quad \text{Equation 1:}$$

Second probable error for Equation 1: $PE_x$=17.6

$$Xe^{Eq2}=(-6343.1\times\mu^{bridge1})+(-21746.6\times\mu^{bridge2})+(15172.6\times\mu^{bridge5})+8477.4 \quad \text{Equation 2:}$$

Second probable error for Equation 2: $PE_x$=128.1

$$Xe^{Eq3}=(-924.9\times\mu^{bridge3})+(6513.9\times\mu^{bridge5})+(80.9\times\mu^{bridge11})+10182.0 \quad \text{Equation 3:}$$

Second probable error for Equation 3: $PE_x$=145.2

$$Xe^{Eq4}=(-688.2\times\mu^{bridge1})+(-559.8\times\mu^{bridge9})+(-570.2\times\mu^{bridge17})+11481.6 \quad \text{Equation 4:}$$

Second probable error for Equation 4: $PE_x$=18.2

$$Xe^{Eq5}=(-667.9\times\mu^{bridge8})+(-2024.6\times\mu^{bridge13})+(-575.1\times\mu^{bridge17})+11872.0 \quad \text{Equation 5:}$$

Second probable error for Equation 5: $PE_x$=25.1

$$Xe^{Eq6}=(-801.3\times\mu^{bridge5})+(-834.1\times\mu^{bridge7})+(-1015.7\times\mu^{bridge19})+11903.2 \quad \text{Equation 6:}$$

Second probable error for Equation 6: $PE_x$=48.3 wherein the second probable error $PE_X$ has been obtained for each group of sensors according to the following expression $$PE_X = C_E \sqrt{\frac{\sum_{i=1}^{s}(Xe_i - X_i)^2}{s-(N_x+1)}}$$

with s=51, $N_w$=3 and $C_E$=0.6745, i denoting the loading state.

From the above results, the equations 1 and 4 were selected due to their lower values for the second probable error. The sensors (4) corresponding to said equations are sensors 3, 9 and 17 for equation 1 and sensors 1, 9 and 17 for equation 4.

x) Four second groups of sensors were selected from the plurality of calibration sensors (4) according to the second probable errors ($PE_X$) previously determined for each group of sensors ($N_w$=4, $N_w$=3). The sensors included in said four second groups are sensors 1, 3, 9, 10, 11 and 17. Said six sensors (4) are thus selected as the installed sensors usable for determining the X-coordinate of the centre of gravity of the aircraft (6). Once performed the calibration steps, the determination of the X-coordinate of the centre of gravity of the aircraft (6) can be performed based on the responses of the sensors (4) according to one or several of the following expressions:

$$Xe^{App1}=(-302.2\times\mu^{bridge3})+(-2523.8\times\mu^{bridge10})+(-393.1\times\mu^{bridge11})+(-570.3\times\mu^{bridge17})+11223.3 \quad \text{Approach 1:}$$

$$Xe^{App2}=(-272.6\times\mu^{bridge3})+(-807.4\times\mu^{bridge9})+(-1508.3\times\mu^{bridge10})+(-571.7\times\mu^{bridge17})+11341.5 \quad \text{Approach 2:}$$

$$Xe^{App3}=(-274.9\times\mu^{bridge3})+(-632.6\times\mu^{bridge9})+(-570.8\times\mu^{bridge17})+11428.6 \quad \text{Approach 3:}$$

$$Xe^{App4}=(-688.2\times\mu^{bridge1})+(-559.8\times\mu^{bridge9})+(-570.2\times\mu^{bridge17})+11481.6 \quad \text{Approach 4:}$$

xi) In this example, the first plurality of installed sensors includes the calibration sensors in the first groups of sensors selected in step vii) and the calibration sensors in the second groups of sensors selected in step x), specifically calibration sensors 1, 3, 5, 9, 10, 11 and 17.

Once the approaches for determining the weight (W) of the aircraft (6) have been obtained in calibration step vii), it is shown below a check that the weight approaches are satisfied for all the loading states i. For this, it is determined a weight residual value ($\varepsilon w_i$) to verify that said obtained weight residual value ($\varepsilon w_i$) is small, wherein $\varepsilon w_i$=100×($We_i$−$W_i$)/$W_i$.

The following tables 11A-11B to 19A-19B show the estimated weight ($We_i$) obtained in the calibration step vi), the subtraction of $We_i$ minus $W_i$ and the weight residual value ($\varepsilon w_i$) for each weight approach and each loading state i respectively. In these tables the weight residual value ($\varepsilon w_i$) has been denoted (Error W)$_i$.

TABLE 11A

CONFIGURATION 1: six loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 109948.564 | −1073.516 | −0.967 | 109336.959 | −1685.121 | −1.518 |
| 115644.949 | −1359.691 | −1.162 | 115131.437 | −1873.203 | −1.601 |
| 122811.347 | 513.587 | 0.420 | 122731.325 | 433.565 | 0.355 |
| 116973.050 | 1569.690 | 1.360 | 116380.646 | 977.286 | 0.847 |
| 110457.225 | −431.415 | −0.389 | 110429.150 | −459.490 | −0.414 |
| 103419.071 | −108.129 | −0.104 | 103366.964 | −160.236 | −0.155 |

TABLE 11B

CONFIGURATION 1: six loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 109332.062 | −1690.018 | −1.522 | 109444.150 | −1577.930 | −1.421 |
| 115260.537 | −1744.103 | −1.491 | 114976.328 | −2028.312 | −1.734 |
| 123181.516 | 883.756 | 0.723 | 122668.120 | 370.360 | 0.303 |
| 116787.422 | 1384.062 | 1.199 | 116719.527 | 1316.167 | 1.140 |
| 109938.178 | −950.462 | −0.857 | 111042.493 | 153.853 | 0.139 |
| 102719.440 | −807.760 | −0.780 | 104384.185 | 856.985 | 0.828 |

TABLE 12A

CONFIGURATION 2: six loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 107734.091 | −952.789 | −0.877 | 106902.448 | −1784 | −1.64 |
| 113746.857 | −411.063 | −0.360 | 113238.508 | −919 | −0.81 |
| 121459.891 | 1297.171 | 1.080 | 120901.919 | 739 | 0.62 |
| 114532.618 | 1798.058 | 1.595 | 114056.485 | 1322 | 1.17 |
| 108071.443 | −14.957 | −0.014 | 107036.658 | −1050 | −0.97 |
| 103717.322 | 368.042 | 0.356 | 102850.655 | −499 | −0.48 |

TABLE 12B

CONFIGURATION 2: six loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 107033.080 | −1653.800 | −1.522 | 107334.331 | −1352.549 | −1.244 |
| 113233.535 | −924.385 | −0.810 | 113485.094 | −672.826 | −0.589 |
| 120863.316 | 700.596 | 0.583 | 121017.248 | 854.528 | 0.711 |
| 114177.419 | 1442.859 | 1.280 | 114648.254 | 1913.694 | 1.698 |
| 107556.163 | −530.237 | −0.491 | 106727.600 | −1358.800 | −1.257 |
| 103411.940 | 62.660 | 0.061 | 102833.303 | −515.977 | −0.499 |

TABLE 13A

CONFIGURATION 3: six loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 107926.108 | −1272.292 | −1.165 | 108122.524 | −1075.876 | −0.985 |
| 114287.281 | −849.199 | −0.738 | 114883.642 | −252.838 | −0.220 |
| 120353.946 | −31.174 | −0.026 | 121172.235 | 787.115 | 0.654 |
| 115738.273 | 668.513 | 0.581 | 116404.779 | 1335.019 | 1.160 |
| 108634.846 | −919.394 | −0.839 | 108500.776 | −1053.464 | −0.962 |
| 103882.990 | −266.930 | −0.256 | 103579.188 | −570.732 | −0.548 |

TABLE 13B

CONFIGURATION 3: six loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 107726.375 | −1472.025 | −1.348 | 107853.734 | −1344.666 | −1.231 |
| 114401.579 | −734.901 | −0.638 | 114471.947 | −664.533 | −0.577 |
| 120779.046 | 393.926 | 0.327 | 120570.177 | 185.057 | 0.154 |
| 115995.272 | 925.512 | 0.804 | 115961.744 | 891.984 | 0.775 |
| 108414.969 | −1139.271 | −1.040 | 108664.251 | −889.989 | −0.812 |
| 103273.587 | −876.333 | −0.841 | 103776.872 | −373.048 | −0.358 |

TABLE 14A

CONFIGURATION 4: five loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 115654.412 | 273.292 | 0.237 | 115036.758 | −344.362 | −0.298 |
| 127465.421 | 297.101 | 0.234 | 127225.883 | 57.563 | 0.045 |
| 138300.782 | 79.182 | 0.057 | 138745.570 | 523.970 | 0.379 |
| 122859.913 | 1140.393 | 0.937 | 122703.194 | 983.674 | 0.808 |
| 103374.989 | −597.011 | −0.574 | 103912.090 | −59.910 | −0.058 |

TABLE 14B

CONFIGURATION 4: five loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 115125.109 | −256.011 | −0.222 | 115254.350 | −126.770 | −0.110 |
| 127310.001 | 141.681 | 0.111 | 126809.203 | −359.117 | −0.282 |
| 138994.816 | 773.216 | 0.559 | 137446.595 | −775.005 | −0.561 |
| 123671.147 | 1951.627 | 1.603 | 123005.105 | 1285.585 | 1.056 |
| 102504.076 | −1467.924 | −1.412 | 104228.222 | 256.222 | 0.246 |

TABLE 15A

CONFIGURATION 5: six loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 103579.156 | −392.844 | −0.378 | 104096.635 | 124.635 | 0.120 |
| 115969.240 | 365.720 | 0.316 | 116554.789 | 951.269 | 0.823 |
| 126714.684 | 146.844 | 0.116 | 126480.027 | −87.813 | −0.069 |
| 136460.101 | 951.781 | 0.702 | 136653.308 | 1144.988 | 0.845 |
| 120919.588 | 1201.668 | 1.004 | 121340.072 | 1622.152 | 1.355 |
| 103774.348 | 1403.628 | 1.371 | 103597.023 | 1226.303 | 1.198 |

TABLE 15B

CONFIGURATION 5: six loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 102707.850 | −1264.150 | −1.216 | 104415.173 | 443.173 | 0.426 |
| 115548.258 | −55.262 | −0.048 | 116748.198 | 1144.678 | 0.990 |
| 126882.744 | 314.904 | 0.249 | 126789.620 | 221.780 | 0.175 |
| 137110.072 | 1601.752 | 1.182 | 136523.422 | 1015.102 | 0.749 |
| 121018.638 | 1300.718 | 1.086 | 121509.089 | 1791.169 | 1.496 |
| 103757.408 | 1386.688 | 1.355 | 104777.513 | 2406.793 | 2.351 |

TABLE 16A

CONFIGURATION 6: six loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 103475.797 | 1105.077 | 1.079 | 103496.991 | 1126.271 | 1.100 |
| 114121.910 | 30.710 | 0.027 | 114345.336 | 254.136 | 0.223 |
| 123915.847 | −1962.553 | −1.559 | 124229.581 | −1648.819 | −1.310 |
| 134284.806 | −734.234 | −0.544 | 135195.347 | 176.307 | 0.131 |
| 121254.584 | 1069.624 | 0.890 | 121383.759 | 1198.799 | 0.997 |
| 100835.340 | −1357.460 | −1.328 | 100590.354 | −1602.446 | −1.568 |

TABLE 16B

CONFIGURATION 6: six loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 103526.181 | 1155 | 1.13 | 104718.952 | 2348 | 2.29 |
| 113143.473 | −948 | −0.83 | 114442.587 | 351 | 0.31 |
| 123197.998 | −2680 | −2.13 | 123357.663 | −2521 | −2.00 |
| 134608.684 | −410 | −0.30 | 133742.688 | −1276 | −0.95 |
| 121800.653 | 1616 | 1.34 | 121710.046 | 1525 | 1.27 |
| 99828.893 | −2364 | −2.31 | 101108.485 | −1084 | −1.06 |

TABLE 17A

CONFIGURATION 7: six loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 101659.254 | −533.546 | −0.522 | 100991.735 | −1201.065 | −1.175 |
| 113240.473 | −494.887 | −0.435 | 112507.813 | −1227.547 | −1.079 |
| 124706.957 | −281.843 | −0.225 | 124304.588 | −684.212 | −0.547 |
| 136006.963 | −390.957 | −0.287 | 136029.344 | −368.576 | −0.270 |
| 119263.349 | −476.811 | −0.398 | 119462.956 | −277.204 | −0.232 |
| 103000.784 | 607.824 | 0.594 | 102653.084 | 260.124 | 0.254 |

TABLE 17B

CONFIGURATION 7: six loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 100388.960 | −1803.840 | −1.765 | 101247.400 | −945.400 | −0.925 |
| 112208.041 | −1527.319 | −1.343 | 112675.391 | −1059.969 | −0.932 |
| 124364.214 | −624.586 | −0.500 | 124335.231 | −653.569 | −0.523 |
| 136153.196 | −244.724 | −0.179 | 135619.167 | −778.753 | −0.571 |
| 119389.671 | −350.489 | −0.293 | 119145.016 | −595.144 | −0.497 |
| 103174.073 | 781.113 | 0.763 | 103287.798 | 894.838 | 0.874 |

TABLE 18A

CONFIGURATION 8: five loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 103078.945 | 685.985 | 0.670 | 102678.592 | 285.632 | 0.279 |
| 111065.588 | −490.252 | −0.439 | 110375.276 | −1180.564 | −1.058 |
| 120266.346 | 726.346 | 0.608 | 119970.855 | 430.855 | 0.360 |
| 112407.615 | 1341.055 | 1.207 | 112587.226 | 1520.666 | 1.369 |
| 101671.578 | −498.982 | −0.488 | 100684.112 | −1486.448 | −1.455 |

TABLE 18B

CONFIGURATION 8: five loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 103326.090 | 933.130 | 0.911 | 103401.188 | 1008.228 | 0.985 |
| 110377.875 | −1177.965 | −1.056 | 110683.614 | −872.226 | −0.782 |
| 119909.858 | 369.858 | 0.309 | 120630.377 | 1090.377 | 0.912 |
| 112323.053 | 1256.493 | 1.131 | 113394.494 | 2327.934 | 2.096 |
| 100695.260 | −1475.300 | −1.444 | 100879.068 | −1291.492 | −1.264 |

TABLE 19A

CONFIGURATION 9: five loading states

| Approach 1 | | | Approach 2 | | |
|---|---|---|---|---|---|
| Wei (N) | Wei − Wi (N) | (Error W)i (%) | Wei (N) | Wei − Wi (N) | (Error W)i (%) |
| 100897.369 | −1224.731 | −1.199 | 100730.350 | −1391.750 | −1.363 |
| 146615.444 | −534.556 | −0.363 | 147551.129 | 401.129 | 0.273 |
| 183209.184 | −2592.216 | −1.395 | 186796.344 | 994.944 | 0.535 |
| 146183.456 | 603.056 | 0.414 | 146327.336 | 746.936 | 0.513 |
| 103897.388 | 1284.788 | 1.252 | 102668.802 | 56.202 | 0.055 |

TABLE 19B

CONFIGURATION 9: five loading states

| Approach 3 | | | Approach 4 | | |
|---|---|---|---|---|---|
| Wei (N) | Wei − Wi (N) | (Error W)i (%) | Wei (N) | Wei − Wi (N) | (Error W)i (%) |
| 100259.757 | −1862.343 | −1.824 | 101095.005 | −1027.095 | −1.006 |
| 147995.318 | 845.318 | 0.574 | 146690.950 | −459.050 | −0.312 |
| 187002.658 | 1201.258 | 0.647 | 183691.178 | −2110.222 | −1.136 |
| 148589.621 | 3009.221 | 2.067 | 146526.219 | 945.819 | 0.650 |
| 104386.737 | 1774.137 | 1.729 | 104052.650 | 1440.050 | 1.403 |

Furthermore, once the approaches for determining the X-coordinate of the centre of gravity of the aircraft (6) have been obtained in the calibration step x), it is shown below a check that the approaches for determining the X-coordinate are satisfactory for all the loading states i. For this, it is determined an error (Error X)$_i$ to verify that said obtained error is small, wherein (Error X)$_i$=100×(Xe$_i$−X$_i$)/2561, wherein such error is calculated according to the overage chord length of the aircraft (6) that is 2561 mm in this example.

The following tables 20A-20B to 28A-28B show the estimate weight Xe$_i$ obtained in the calibration step ix), the subtraction of Xe$_i$ minus X$_i$ and the (Error X)$_i$ for each weight approach and each loading state i respectively.

TABLE 20A

CONFIGURATION 1: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11136.066 | 18.720 | 0.731 | 11139.023 | 21.677 | 0.846 |
| 10907.772 | 71.777 | 2.803 | 10908.658 | 72.663 | 2.837 |
| 10593.342 | −21.314 | −0.832 | 10594.190 | −20.466 | −0.799 |

TABLE 20A-continued

CONFIGURATION 1: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 10935.783 | −12.510 | −0.488 | 10932.669 | −15.624 | −0.610 |
| 11186.558 | 22.143 | 0.865 | 11188.943 | 24.527 | 0.958 |
| 11394.864 | −29.844 | −1.165 | 11394.086 | −30.622 | −1.196 |

TABLE 20B

CONFIGURATION 1: six loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11132.637 | 15.291 | 0.597 | 11135.413 | 18.067 | 0.705 |
| 10901.449 | 65.454 | 2.556 | 10904.648 | 68.654 | 2.681 |
| 10595.984 | −18.672 | −0.729 | 10596.849 | −17.806 | −0.695 |
| 10929.102 | −19.192 | −0.749 | 10929.632 | −18.662 | −0.729 |
| 11184.980 | 20.565 | 0.803 | 11177.962 | 13.546 | 0.529 |
| 11392.846 | −31.862 | −1.244 | 11384.282 | −40.426 | −1.579 |

TABLE 21A

CONFIGURATION 2: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11507.900 | −1.989 | −0.078 | 11505.384 | −4.505 | −0.176 |
| 11562.908 | −27.465 | −1.072 | 11558.962 | −31.411 | −1.227 |
| 11656.214 | −17.723 | −0.692 | 11660.544 | −13.393 | −0.523 |
| 11578.985 | −0.193 | −0.008 | 11585.886 | 6.708 | 0.262 |
| 11469.759 | −39.501 | −1.542 | 11468.388 | −40.871 | −1.596 |
| 11408.230 | −12.020 | −0.469 | 11406.466 | −13.785 | −0.538 |

TABLE 21B

CONFIGURATION 2: six loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11501.730 | −8.158 | −0.319 | 11505.024 | −4.864 | −0.190 |
| 11555.748 | −34.625 | −1.352 | 11556.988 | −33.385 | −1.304 |
| 11651.306 | −22.631 | −0.884 | 11650.408 | −23.528 | −0.919 |
| 11586.326 | 7.148 | 0.279 | 11585.039 | 5.860 | 0.229 |
| 11468.124 | −41.135 | −1.606 | 11482.133 | −27.127 | −1.059 |
| 11413.547 | −6.703 | −0.262 | 11426.723 | 6.472 | 0.253 |

TABLE 22A

CONFIGURATION 3: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11193.740 | 30.860 | 1.205 | 11185.753 | 22.873 | 0.893 |
| 10956.661 | 32.100 | 1.253 | 10950.132 | 25.570 | 0.998 |
| 10726.427 | −12.539 | −0.490 | 10726.941 | −12.025 | −0.470 |

TABLE 22A-continued

CONFIGURATION 3: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 10925.569 | −14.431 | −0.564 | 10920.049 | −19.951 | −0.779 |
| 11161.407 | 4.242 | 0.166 | 11159.736 | 2.571 | 0.100 |
| 11370.676 | −24.878 | −0.971 | 11362.273 | −33.280 | −1.300 |

TABLE 22B

CONFIGURATION 3: six loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11189.436 | 26.555 | 1.037 | 11193.178 | 30.298 | 1.183 |
| 10953.622 | 29.061 | 1.135 | 10954.260 | 29.699 | 1.160 |
| 10730.560 | −8.406 | −0.328 | 10730.425 | −8.541 | −0.333 |
| 10925.409 | −14.591 | −0.570 | 10926.265 | −13.735 | −0.536 |
| 11162.337 | 5.173 | 0.202 | 11164.471 | 7.307 | 0.285 |
| 11361.707 | −33.846 | −1.322 | 11364.262 | −31.291 | −1.222 |

TABLE 23A

CONFIGURATION 4: five loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11340.745 | −23.500 | −0.918 | 11341.664 | −22.581 | −0.882 |
| 11321.121 | −23.155 | −0.904 | 11317.413 | −26.862 | −1.049 |
| 11320.782 | −0.068 | −0.003 | 11313.757 | −7.092 | −0.277 |
| 11389.357 | 7.887 | 0.308 | 11386.535 | 5.065 | 0.198 |
| 11425.339 | 10.595 | 0.414 | 11424.925 | 10.181 | 0.398 |

TABLE 23B

CONFIGURATION 4: five loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11335.512 | −28.733 | −1.122 | 11336.197 | −28.048 | −1.095 |
| 11311.654 | −32.622 | −1.274 | 11312.930 | −31.346 | −1.224 |
| 11319.840 | −1.009 | −0.039 | 11326.127 | 5.277 | 0.206 |
| 11406.231 | 24.761 | 0.967 | 11411.066 | 29.596 | 1.156 |
| 11420.113 | 5.369 | 0.210 | 11411.170 | −3.574 | −0.140 |

TABLE 24A

CONFIGURATION 5: five loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11423.878 | 9.134 | 0.357 | 11423.419 | 8.675 | 0.339 |
| 11312.203 | 10.277 | 0.401 | 11310.417 | 8.492 | 0.332 |
| 11218.488 | −5.632 | −0.220 | 11223.579 | −0.541 | −0.021 |

TABLE 24A-continued

CONFIGURATION 5: five loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11120.367 | −30.519 | −1.192 | 11126.869 | −24.017 | −0.938 |
| 11246.176 | −21.611 | −0.844 | 11248.162 | −19.625 | −0.766 |
| 11409.889 | −14.952 | −0.584 | 11414.976 | −9.865 | −0.385 |

TABLE 24B

CONFIGURATION 5: five loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11418.442 | 3.698 | 0.144 | 11409.566 | −5.178 | −0.202 |
| 11305.773 | 3.848 | 0.150 | 11295.794 | −6.132 | −0.239 |
| 11223.608 | −0.512 | −0.020 | 11220.994 | −3.125 | −0.122 |
| 11130.099 | −20.788 | −0.812 | 11127.436 | −23.451 | −0.916 |
| 11251.082 | −16.705 | −0.652 | 11245.428 | −22.358 | −0.873 |
| 11429.092 | 4.251 | 0.166 | 11426.465 | 1.624 | 0.063 |

TABLE 25A

CONFIGURATION 6: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11408.630 | −16.211 | −0.633 | 11413.504 | −11.337 | −0.443 |
| 11565.346 | 21.332 | 0.833 | 11566.895 | 22.881 | 0.893 |
| 11575.284 | −55.552 | −2.169 | 11568.640 | −62.195 | −2.429 |
| 11736.004 | 43.580 | 1.702 | 11732.613 | 40.189 | 1.569 |
| 11604.991 | 18.791 | 0.734 | 11608.822 | 22.622 | 0.883 |
| 11425.362 | 2.353 | 0.092 | 11433.574 | 10.565 | 0.413 |

TABLE 25B

CONFIGURATION 6: six loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11429.305 | 4.464 | 0.174 | 11425.099 | 0.258 | 0.010 |
| 11554.890 | 10.876 | 0.425 | 11545.602 | 1.588 | 0.062 |
| 11557.115 | −73.720 | −2.879 | 11554.240 | −76.595 | −2.991 |
| 11738.766 | 46.342 | 1.810 | 11741.482 | 49.058 | 1.916 |
| 11626.788 | 40.588 | 1.585 | 11627.411 | 41.212 | 1.609 |
| 11427.484 | 4.475 | 0.175 | 11424.106 | 1.096 | 0.043 |

TABLE 26A

CONFIGURATION 7: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11432.179 | 9.170 | 0.358 | 11438.390 | 15.381 | 0.601 |
| 11502.177 | −7.661 | −0.299 | 11503.147 | −6.691 | −0.261 |
| 11590.410 | 18.107 | 0.707 | 11593.340 | 21.037 | 0.821 |

TABLE 26A-continued

CONFIGURATION 7: six loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11653.545 | 20.855 | 0.814 | 11660.901 | 28.211 | 1.102 |
| 11543.481 | −8.578 | −0.335 | 11541.608 | −10.452 | −0.408 |
| 11429.627 | 16.909 | 0.660 | 11427.587 | 14.870 | 0.581 |

TABLE 26B

CONFIGURATION 7: six loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11425.917 | 2.907 | 0.114 | 11426.385 | 3.376 | 0.132 |
| 11488.403 | −21.435 | −0.837 | 11487.706 | −22.132 | −0.864 |
| 11586.601 | 14.298 | 0.558 | 11585.772 | 13.469 | 0.526 |
| 11657.733 | 25.042 | 0.978 | 11656.894 | 24.204 | 0.945 |
| 11548.565 | −3.494 | −0.136 | 11551.930 | −0.130 | −0.005 |
| 11446.350 | 33.632 | 1.313 | 11452.938 | 40.220 | 1.570 |

TABLE 27A

CONFIGURATION 8: five loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11419.388 | 6.670 | 0.260 | 11418.375 | 5.657 | 0.221 |
| 11330.120 | 5.257 | 0.205 | 11332.622 | 7.759 | 0.303 |
| 11264.790 | 1.091 | 0.043 | 11271.879 | 8.180 | 0.319 |
| 11330.075 | −11.256 | −0.440 | 11339.475 | −1.856 | −0.072 |
| 11414.069 | 2.999 | 0.117 | 11413.009 | 1.939 | 0.076 |

TABLE 27B

CONFIGURATION 8: five loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11438.654 | 25.937 | 1.013 | 11445.525 | 32.807 | 1.281 |
| 11324.350 | −0.513 | −0.020 | 11325.688 | 0.825 | 0.032 |
| 11263.387 | −0.313 | −0.012 | 11256.374 | −7.325 | −0.286 |
| 11344.093 | 2.762 | 0.108 | 11337.119 | −4.212 | −0.164 |
| 11406.599 | −4.471 | −0.175 | 11413.501 | 2.431 | 0.095 |

TABLE 28A

CONFIGURATION 9: five loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11399.206 | −13.652 | −0.533 | 11398.602 | −14.256 | −0.557 |
| 11388.292 | −21.345 | −0.833 | 11399.287 | −10.350 | −0.404 |
| 11377.973 | −21.042 | −0.822 | 11420.301 | 21.286 | 0.831 |

TABLE 28A-continued

CONFIGURATION 9: five loading states

| Approach 1 | | | Approach 2 | | |
|---|---|---|---|---|---|
| Xei (mm) | Xei − Xi (mm) | (Error X)i (%) | Xei (mm) | Xei − Xi (mm) | (Error X)i (%) |
| 11358.023 | −73.608 | −2.874 | 11384.173 | −47.458 | −1.853 |
| 11385.643 | −14.620 | −0.571 | 11388.926 | −11.337 | −0.443 |

TABLE 28B

CONFIGURATION 9: five loading states

| Approach 3 | | | Approach 4 | | |
|---|---|---|---|---|---|
| Xei (mm) | Xei − Xi (mm) | (Error X)i (%) | Xei (mm) | Xei − Xi (mm) | (Error X)i (%) |
| 11400.112 | −12.745 | −0.498 | 11400.839 | −12.019 | −0.469 |
| 11413.602 | 3.965 | 0.155 | 11414.256 | 4.619 | 0.180 |
| 11462.954 | 63.939 | 2.497 | 11466.204 | 67.189 | 2.624 |
| 11422.004 | −9.627 | −0.376 | 11429.763 | −1.868 | −0.073 |
| 11413.964 | 13.701 | 0.535 | 11424.239 | 23.976 | 0.936 |

Therefore, this example performed on an aircraft shows that the method of the present invention provides valid estimations for the values of the weight and the X-coordinate of the position of the centre of gravity of the aircraft. Also, it has been shown that the method allows obtaining several mathematical expressions for determining the values of the weight and of the position of the centre of gravity. The fact that different mathematical expressions provide very similar results shows that the results are accurate and reliable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for determining a weight (W) and/or at least a first coordinate (X) of a position of a centre of gravity of a structure, the method comprising the following steps:
    a) measuring responses ($\mu$) of a first plurality of installed sensors located in sensitive load points of the structure, and
    b) determining the weight (W) and/or the first coordinate (X) of the position of the centre of gravity of the structure based on the responses ($\mu$), as:

$$W = C_w + \sum_{j_w=1}^{k_w} \mu_{j_w} \cdot \beta_{j_w}$$

$$X = C_x + \sum_{j_x=1}^{k_x} \mu_{j_x} \cdot \gamma_{j_x}$$

wherein W is the weight of the structure, X is the first coordinate of the position of the centre of gravity of the structure on a plane of projection, $k_W$ and $k_x$, are natural numbers and $\mu$ are the responses ($\mu$) measured by the first plurality of installed sensors, wherein a subscript in each of the responses ($\mu$) denotes a corresponding sensor of the first plurality of the installed sensors which has performed the measurement, wherein for determining the weight (W) a first group of sensors is used which comprises a number of installed sensors $k_w$, for determining the first coordinate (X) of the centre of gravity a second group of sensors is used which comprises a number of installed sensors $k_x$, and wherein coefficients $\beta_{j_w}$, with $j_w=1, \ldots k_w$, and $\gamma_{j_x}$, with $j_x=1, \ldots k_x$, and constants $C_w$, and $c_x$ are previously determined applying the following calibration steps:

i) locating a plurality of calibration sensors in sensitive load points of the structure, wherein the number of calibration sensors is m, m being a natural number, ii) loading the structure with a probe weight ($Wp_i$), obtaining a loading state (i), and measuring the first coordinate ($X_i$) of the position of the centre of gravity and the weight ($W_i$) of the structure in said loading state (i), iii) measuring for each calibration sensor (r) the response ($\mu_{r,i}$) associated to the loading state (i), with $r=1, \ldots m$, being r a natural number, iv) repeating steps ii) and iii) for a plurality of loading states (i), with $i=1, s$, being s the number of loading states, s being a natural number, v) selecting groups of at least two calibration sensors and solving for each group an equation system with a number of equations (P) equal to or greater than $N_w+1$, being $N_w$ the number of calibration sensors in the group, wherein the equation system is:

$$W_1 = C_w + \sum_{n=1}^{N_w} \mu_{n,1} \cdot \beta_n$$

$$\vdots$$

$$W_P = C_w + \sum_{n=1}^{N_w} \mu_{n,P} \cdot \beta_n$$

$\mu_{n,q}$, with $n=1, \ldots, N_w$, being the measured responses of the calibration sensors and $W_q$ being the weight associated to the respective loading state q, $q=1, P$, wherein the equation systems are solved by least squares method, obtaining as a result weight coefficients ($\beta_n$) for $n=1, \ldots, N_w$, and weight constant ($C_w$), vi) determining for each group of calibration sensors an estimated weight ($We_i$) for each loading state (i) as $$We_i = C_w + \sum_{n=1}^{N_w} \mu_{n,i} \cdot \beta_n$$

wherein $\mu_{n,i}$ are the responses of the calibration sensors of the group, associated to a loading state i, vii) selecting a first group of calibration sensors which fulfils that a first probable error ($PE_w$) is minimum, wherein $PE_w$ is:

$$PE_w = C_E \sqrt{\frac{\sum_{i=1}^{s}(We_i - W_i)^2}{s - (N_w + 1)}}$$

s being the total number of loading states, $N_w$ being the number of calibration sensors in said group of calibration sensors, and $C_E$ being a real positive number, viii) selecting groups of at least two calibration sensors and solving for each group an equation system with a number of equations (P) equal or greater than $N_x+1$, being $N_x$ the number of calibration sensors in the group, wherein the equation systems is:

$$X_1 = C_x + \sum_{n=1}^{N_x} \mu_{n,1} \cdot \gamma_n$$

$$\vdots$$

$$X_P = C_x + \sum_{n=1}^{N_x} \mu_{n,P} \cdot \gamma_n$$

$\mu_{n,q}$, with n=1, ..., $N_x$, being the measured responses of the calibration sensors and $X_q$ being the X-coordinate of the centre of gravity associated to the respective loading state q, q=1, ..., P,
wherein the equation systems are solved by least squares method, obtaining as a result X-coefficients ($\gamma_n$) for n=1, ..., $N_x$, and X-constant ($C_x$), ix) determining for each group of calibration sensors an estimated X-coordinate ($Xe_i$) of the centre of gravity for each loading state (i), as $$Xe_i = C_x + \sum_{n=1}^{N_x} \mu_{n,i} \cdot \gamma_n$$

wherein $\mu_{n,i}$ are the responses of the calibration sensors of the group, associated to a loading state i, x) selecting a second group of calibration sensors which fulfils that a second probable error ($PE_x$) is minimum, wherein $PE_x$ is:

$$PE_X = C_E \sqrt{\frac{\sum_{i=1}^{s}(Xe_i - X_i)^2}{s - (N_x + 1)}}$$

s being the total number of loading states, $N_x$ being the number of calibration sensors in said group of calibration sensors, and $C_E$ being a real positive number, xi) selecting as the first plurality of installed sensors a plurality of calibration sensors including:
the first group of calibration sensors selected in step vii), and
the second group of calibration sensors selected in step x), wherein $k_w$ is the number of sensors in the first group of calibration sensors and $k_x$, is the number of sensors in the second group of calibration sensors.

2. The method according to claim 1, further comprising determining a second coordinate (Y) of the position of the centre of gravity of the structure, wherein the second coordinate (Y) of the position of the centre of gravity of the structure is determined based on the measured responses ($\mu$) of the first plurality of installed sensors, as:

$$Y = C_y + \sum_{j_y=1}^{k_y} \mu_{j_y} \cdot \tau_{j_y}$$

wherein Y is the second coordinate of the position of the centre of gravity of the structure on a plane of projection, $k_y$ is a natural number and $\mu$ are the responses measured by the first plurality of installed sensors, wherein the subscript in the response $\mu$ denotes the sensor which has performed the measurement, wherein for determining the second coordinate (Y) of the position of the centre of gravity a third group of sensors is used which comprises a number of installed sensors $k_y$, and wherein Y-coefficients $\tau_{j_y}$, with $j_y=1, \ldots k_y$, and Y-constant $C_y$, are previously determined applying the following calibration steps at least after steps i)-iv), wherein the step ii) further comprises measuring the second coordinate ($Y_i$) of the position of the centre of gravity of the structure in each loading state (i):

viii') selecting groups of at least two calibration sensors and solving for each group an equation system with a number of equations (P) equal or greater than $N_y+1$, being $N_y$ the number of calibration sensors in the group, wherein the equation systems is:

$$Y_1 = C_y + \sum_{n=1}^{N_y} \mu_{n,1} \cdot \tau_n$$

$$\vdots$$

$$Y_P = C_y + \sum_{n=1}^{N_y} \mu_{n,P} \cdot \tau_n$$

$\mu_{n,q}$, with n=1, ..., $N_y$, being the measured responses of the calibration sensors and $Y_q$ being the Y-coordinate of the centre of gravity associated to the respective loading state q, q=1, ..., P,
wherein the equation systems are solved by least squares method, obtaining as a result Y-coefficients ($\tau_n$) for n=1, ..., $N_y$, and Y-constant ($C_y$), ix') determining for each group of calibration sensors an estimated Y-coordinate ($Ye_i$) of the centre of gravity for each loading state (i), as $$Ye_i = C_y + \sum_{n=1}^{N_y} \mu_{n,i} \cdot \tau_n$$

where $\mu_{n,i}$ are the responses of the calibration sensors of the group, associated to a loading state i, and x') selecting a third group of calibration sensors which fulfils that a third probable error ($PE_y$) is minimum, wherein $PE_y$ is:

$$PE_Y = C_E \sqrt{\frac{\sum_{i=1}^{s}(Ye_i - Y_i)^2}{s - (N_y + 1)}}$$

s being the total number of loading states, $N_y$ being the number of calibration sensors in said group of calibration sensors, and $C_E$ being a real positive number, wherein the first plurality of installed sensors further includes the third group of calibration sensors selected in step x') and wherein $k_y$ is the number of sensors in the third group of calibration sensors.

3. The method according to claim 2, further comprising the following steps:

c) measuring the responses (µ') of a second plurality of installed sensors located in at least one lifting surface (h) of the structure, and d) determining a corrected weight of the structure W ($W_{corrected}$) and/or a corrected position ($X_{corrected}$, $Y_{corrected}$) of the centre of gravity of the structure as:

$$W_{corrected} = W - \sum_{h=1}^{M} V'_h$$

$$X_{corrected} = \frac{X \cdot W - \sum_{h=1}^{M}(X'_h \cdot V'_h)}{W - \sum_{h=1}^{M} V'_h}$$

$$Y_{corrected} = \frac{Y \cdot W - \sum_{h=1}^{M}(Y'_h \cdot V'_h)}{W - \sum_{h=1}^{M} V'_h}$$

wherein W is the calculated weight of the structure, (X, Y) is the calculated position of the centre of gravity of the structure, wherein M is the number of lifting surfaces considered at step c), wherein $V'_h$ is the vertical component of a resultant force applied on a lifting surface h of the structure, wherein $X'_h$ and $Y'_h$ are the X-coordinate and Y-coordinate, respectively, through which the vertical component of the resultant force ($V'_h$) passes, wherein $V'_h$, $X'_h$, and $Y'_h$ are determined based on the measured responses (µ'), for each lifting surface (h) as:

$$V' = C'_v + \sum_{j_v=1}^{L_v} \mu'_{j_v} \cdot \beta'_{j_v}$$

$$X' = C'_x + \sum_{j_x=1}^{L_x} \mu'_{j_x} \cdot \gamma'_{j_x}$$

$$Y' = C'_y + \sum_{j_y=1}^{L_y} \mu'_{j_y} \cdot \tau'_{j_y}$$

wherein µ' are the responses measured by the second plurality of installed sensors, the subscript in the response (µ') denoting the sensor which has performed the measurement, being $L_v$, $L_x$, and $L_y$ natural numbers, wherein W, V' and $W_{corrected}$ are expressed in the same axes system; X, X' and $X_{corrected}$ are expressed according to the same coordinate system, and Y, Y' and $Y_{corrected}$ are expressed according to the same coordinate system, and wherein:

for determining V' a fourth group of sensors is used which comprises a number of installed sensors $L_v$, for determining X' a fifth group of sensors is used which comprises a number of installed sensors $L_x$, for determining Y' a sixth group of sensors is used which comprises a number of installed sensors $L_y$, and wherein coefficients ($\beta_{j_v}$, with $j_v=1, \ldots L_v$ $\gamma'_{j_x}$, with $j_x=1, \ldots L_x$, and $\tau'_{j_y}$, with $j_y=1, \ldots L_y$, and constants $C'_v$, $C'_x$, $C'_y$ are previously determined applying the following calibration steps:

s-i) locating a plurality of calibration sensors in at least one lifting surface (h) of the structure, wherein the number of calibration sensors is m', m' being a natural number, s-ii) applying a probe force to the at least one lifting surface (h) of the structure, obtaining a force state (f), and measuring the vertical component of the resultant force ($V'_f$), the X-coordinate ($X'_f$) and the Y-coordinate ($Y'_f$) respectively through which the vertical component of the resultant force ($V'_f$) passes in said force state (f), s-iii) measuring for each calibration sensor (r) the response ($\mu'_{r,f}$) associated to the force state (f), with r=1, ... m', being r a natural number, s-iv) repeating steps s-ii) and s-iii) for a plurality of force states (f), with f=1, ... s', being s' the number of force states, wherein for each force state (f) a different probe force is applied to the at least one lifting surface (h), s' being a natural number, s-v) selecting groups of at least two calibration sensors and solving for each group an equation system with a number of equations (P) greater than $N_v+1$, being $N_v$ the number of calibration sensors in the group, wherein the equation system is:

$$V'_1 = C'_v + \sum_{n=1}^{N_v} \mu'_{n,1} \cdot \beta'_n$$

$$\vdots$$

$$V'_P = C'_v + \sum_{n=1}^{N_v} \mu'_{n,P} \cdot \beta'_n$$

with $\mu'_{n,q}$, with n=1, ..., $N_v$, being the measured responses of the calibration sensors and $V'_q$ being the vertical component of the resultant force measured for the respective force state q, with q=1, ..., P, wherein the equation systems are solved by least squares method, obtaining as a result vertical force coefficients $\beta'_n$ for n=1, ..., $N_v$ and constant $C'_v$, s-vi) determining, for each group of calibration sensors an estimated vertical force ($Ve'_f$) for each force state (f) as $$Ve'_f = C'_v + \sum_{n=1}^{N_v} \mu'_{n,f} \cdot \beta'_n$$

where $\mu'_{n,f}$ are the responses of the calibration sensors of the group, associated to a force state $f$, s-vii) selecting a fourth group of calibration sensors which fulfils that fourth probable error (PE'$_v$) is minimum, wherein PE'$_v$ is:

$$PE'_v = C_E \sqrt{\frac{\sum_{f=1}^{s'}(Ve'_f - V'_f)^2}{s' - (N_v + 1)}}$$

s' being the total number of force states, $N_v$ being the number of calibration sensors in said group of calibration sensors, and $C_E$ being a real positive number, s-viii) selecting groups of at least two calibration sensors and solving for each group an equation system with a number of equations (P) equal to or greater than $N_x+1$, being $N_x$ the number of calibration sensors in the group, wherein the equation systems is:

$$X'_1 = C'_x + \sum_{n=1}^{N_x} \mu'_{n,1} \cdot \gamma'_n$$

$$\vdots$$

$$X'_P = C'_x + \sum_{n=1}^{N_x} \mu'_{n,P} \cdot \gamma'_n$$

$\mu'_{n,q}$, with n=1, ..., $N_x$, being the measured responses of the calibration sensors and X'$_q$ being the X-coordinate through which the measured vertical component of the resultant force (V'$_q$) passes, associated to the respective force state q, q=1, ..., P wherein the equation systems are solved by least squares method, obtaining as a result X-coefficients $\gamma'_n$ for n=1, ..., $N_x$, and X-constant C'$_x$, s-ix) determining for each group of calibration sensors an estimated X-coordinate (Xe'$_f$) through which the vertical component of the resultant force (V'$_f$) passes for each force state ($f$), as $$Xe'_f = C'_x + \sum_{n=1}^{N_x} \mu'_{n,f} \cdot \gamma'_n$$

where $\mu'_{n,f}$ are the responses of the calibration sensors of the selected group associated to a force state ($f$), s-x) selecting a fifth group of calibration sensors which fulfils that a fifth probable error (PE'$_x$) is minimum, wherein PE'$_x$ is:

$$PE'_X = C_E \sqrt{\frac{\sum_{f=1}^{s'}(Xe'_f - X'_f)^2}{s' - (N_x + 1)}}$$

s' being the total number of force states, $N_x$ being the number of calibration sensors in said group of calibration sensors, and $C_E$ being a real positive number, s-xi) selecting groups of at least two calibration sensors and solving for each group an equation system with a number of equations P equal or greater than $N_y+1$, being $N_y$ the number of calibration sensors in the group, wherein the equation systems is:

$$Y'_1 = C'_y + \sum_{n=1}^{N_y} \mu'_{n,1} \cdot \tau'_n$$

$$\vdots$$

$$Y'_P = C'_y + \sum_{n=1}^{N_y} \mu'_{n,P} \cdot \tau'_n$$

$\mu'_{n,q}$, with n=1, ..., $N_y$, being the measured responses of the calibration sensors and Y'$_q$ being the Y-coordinate through which the measured vertical component of the resultant force (V'$_q$) passes associated to the respective force state (q), q=1, ..., P wherein the equation systems are solved by least squares method, obtaining as a result Y-coefficients $\tau'_n$ for n=1, ..., $N_y$ and Y-constant C'$_y$, s-xii) determining for each group of calibration sensors an estimated Y-coordinate (Ye'$_f$) through which the vertical component of the resultant force (V'$_f$) passes for each force state ($f$), as $$Ye'_f = C'_y + \sum_{n=1}^{N_y} \mu'_{n,f} \cdot \tau'_n$$

where $\mu'_{n,f}$ are the responses of the calibration sensors of the selected group associated to a force state $f$, s-xiii) selecting a sixth group of calibration sensors which fulfils that a sixth probable error (PE'$_y$) is minimum, wherein PE'$_y$ is:

$$PE'_Y = C_E \sqrt{\frac{\sum_{f=1}^{s'}(Ye'_f - Y'_f)^2}{s' - (N_y + 1)}}$$

s' being the total number of force states, $N_y$ being the number of calibration sensors in said group of calibration sensors, and $C_E$ being a real positive number, s-xiv) selecting as the second plurality of installed sensors a plurality of calibration sensors including:
the fourth group of calibration sensors selected in step s-vii),
the fifth group of calibration sensors selected in step s-x), and
the sixth group of calibration sensors selected in step s-xiii),
wherein $L_v$ is the number of sensors in the fourth group of calibration sensors, $L_x$ is the number of sensors in the fifth group of calibration sensors and $L_y$ is the number of sensors in the sixth group of calibration sensors.

4. The method according to claim 1, comprising, after steps vii), x) and/or x'), verifying for at least one loading state i that the first group of calibration sensors fulfills that a weight residual value ($\varepsilon W_i$) is lower than a first predefined threshold, $$\varepsilon w_i = 100 \cdot \frac{(We_i - W_i)}{W_i},$$

wherein and/or
the second group of calibration sensors fulfills that a X-coordinate residual value ($\varepsilon X_i$) is lower than a second predefined threshold, $$\varepsilon x_i = 100 \cdot \frac{(Xe_i - X_i)}{X_i},$$

wherein and/or
the third group of calibration sensors fulfills that a Y-coordinate residual value ($E y_i$) is lower than a third predefined threshold,
wherein $$\varepsilon y_i = 100 \cdot \frac{(Ye_i - Y_i)}{Y_i}.$$

5. The method according to claim 1, wherein at each iteration of step ii) the structure is loaded with the probe weights $Wp_i$ in steps of a predetermined percentage of a maximum admissible weight of the structure.

6. The method according to claim 1, wherein the structure is an on ground vehicle.

7. The method according to claim 6, wherein at least one sensitive load point is located in at least one bulkhead of the vehicle.

8. The method according to claim 6, wherein the on ground vehicle is an aircraft.

9. The method according to claim 8, wherein at least one sensitive load point is located in at least one landing gear bulkhead.

10. The method according to claim 8, wherein at least one sensitive load point is located in the nose landing gear pin.

11. The method according to claim 8, wherein at least one sensitive load point is located in the main landing gear pin.

12. The method according to claim 1, wherein the first coordinate ($X_i$) of the position of the centre of gravity and/or the weight ($W_i$) is measured in calibration step ii) using scales and/or jacks with load cells, preferably, using three hydraulic jacks.

13. The method according to claim 1, wherein
at step vii) a plurality of first groups of calibration sensors are selected, which fulfil that the first probable error is minimum, and/or wherein
at step x) a plurality of second groups of calibration sensors are selected, which fulfil that the second probable error is minimum, and/or wherein
at step x') a plurality of third groups of calibration sensors are selected, which fulfil that the third probable error is minimum.

14. A system configured for determining a weight (W) and/or at least a first coordinate of a position of s centre of gravity of a structure, comprising:

a plurality of installed sensors located on the structure,
a data acquisition module configured to register data from the plurality of installed sensors located on the structure, and
a data processor configured to:
determine the weight (W) and/or the first coordinate (X) of the position of the centre of gravity of the structure based on measured responses ($\mu$), as:

$$W = C_w + \sum_{j_w=1}^{k_w} \mu_{j_w} \cdot \beta_{j_w}$$

$$X = C_x + \sum_{j_x=1}^{k_x} \mu_{j_x} \cdot \gamma_{j_x}$$

wherein W is the weight of the structure, X is the first coordinate of the position of the centre of gravity of the structure on a plane of projection, $k_w$ and $k_x$ are natural numbers and $\mu$ are the responses measured by the first plurality of installed sensors, wherein a subscript in each of the measured responses ($\mu$) denotes a sensor which has performed a corresponding one of the measurement responses ($\mu$),
wherein
for determining the weight (W) a first group of sensors is used which comprises a number of installed sensors $k_w$,
for determining the first coordinate (X) of the centre of gravity a second group of sensors is used which comprises a number of installed sensors $k_x$, and wherein
coefficients $\beta_{j_w}$, with $j_w=1, \ldots k_w$, and $\gamma_{j_x}$, with $j_x=1, \ldots k_x$, and constants $C_w$ and $C_x$ are previously determined applying the following calibration steps:
 i) locating a plurality of calibration sensors in sensitive load points of the structure, wherein the number of calibration sensors is m, m being a natural number,
 ii) loading the structure with a probe weight ($Wp_i$), obtaining a loading state (i), and measuring the first coordinate ($X_i$) of the position of the centre of gravity and the weight ($W_i$) of the structure in said loading state (i),
 iii) measuring for each calibration sensor (r) the response ($\mu_{r,i}$) associated to the loading state (i), with $r=1, \ldots m$, being r a natural number,
 iv) repeating steps ii) and iii) for a plurality of loading states (i), with $i=1, \ldots s$, being s the number of loading states, s being a natural number,
 v) selecting groups of at least two calibration sensors and solving for each group an equation system with a number of equations (P) equal to or greater than $N_w+1$, being $N_w$ the number of calibration sensors in the group, wherein the equation system is:

$$W_1 = C_w + \sum_{n=1}^{N_w} \mu_{n,1} \cdot \beta_n$$

$$\vdots$$

$$W_P = C_w + \sum_{n=1}^{N_w} \mu_{n,P} \cdot \beta_n$$

$\mu_{n,q}$, with $n=1, \ldots, N_w$, being the measured responses of the calibration sensors and $W_q$ being the weight associated to the respective loading state q, $q=1, \ldots, P$, wherein the equation systems are solved by least squares method, obtaining as a result weight coefficients ($\beta_n$) for n=1, ..., $N_w$ and weight constant ($C_w$), vi) determining for each group of calibration sensors an estimated weight ($We_i$) for each loading state (i) as $$We_i = C_w + \sum_{n=1}^{N_w} \mu_{n,i} \cdot \beta_n$$

wherein $\mu_{n,i}$ are the responses of the calibration sensors of the group, associated to a loading state i, vii) selecting a first group of calibration sensors which fulfils that a first probable error ($PE_w$) is minimum, wherein $PE_w$ is:

$$PE_w = C_E \sqrt{\frac{\sum_{i=1}^{s}(We_i - W_i)^2}{s - (N_w + 1)}}$$

s being the total number of loading states, $N_w$ being the number of calibration sensors in said group of calibration sensors, and $C_E$ being a real positive number, viii) selecting groups of at least two calibration sensors and solving for each group an equation system with a number of equations (P) equal or greater than $N_x+1$, being $N_x$ the number of calibration sensors in the group, wherein the equation systems is:

$$X_1 = C_x + \sum_{n=1}^{N_x} \mu_{n,1} \cdot \gamma_n$$

$$\vdots$$

$$X_P = C_x + \sum_{n=1}^{N_x} \mu_{n,P} \cdot \gamma_n$$

$\mu_{n,q}$, with n=1, ..., $N_x$, being the measured responses of the calibration sensors and $X_q$ being the X-coordinate of the centre of gravity associated to the respective loading state q, q=1, ...,P, wherein the equation systems are solved by least squares method, obtaining as a result X-coefficients ($\gamma_n$) for n=1, ..., $N_x$, and X-constant ($C_x$), ix) determining for each group of calibration sensors an estimated X-coordinate ($Xe_i$) of the centre of gravity for each loading state (i), as $$Xe_i = C_x + \sum_{n=1}^{N_x} \mu_{n,i} \cdot \gamma_n$$

wherein $\mu_{n,1}$ are the responses of the calibration sensors of the group, associated to a loading state i, x) selecting a second group of calibration sensors which fulfils that a second probable error ($PE_x$) is minimum, wherein $PE_x$ is:

$$PE_X = C_E \sqrt{\frac{\sum_{i=1}^{s}(Xe_i - X_i)^2}{s - (N_x + 1)}}$$

s being the total number of loading states, $N_x$ being the number of calibration sensors in said group of calibration sensors, and $C_E$ being a real positive number, xi) selecting as the first plurality of installed sensors a plurality of calibration sensors including:
the first group of calibration sensors selected in step vii), and
the second group of calibration sensors selected in step x),
wherein $k_w$ is the number of sensors in the first group of calibration sensors and $k_x$ is the number of sensors in the second group of calibration sensors.

15. A vehicle comprising the system according to claim 14.

* * * * *